US012300904B2

(12) United States Patent
Zhang et al.

(10) Patent No.: US 12,300,904 B2
(45) Date of Patent: May 13, 2025

(54) LIQUID CRYSTAL METASURFACE ANTENNA APPARATUS AND COMMUNICATION APPARATUS

(71) Applicant: Huawei Technologies Co., Ltd., Shenzhen (CN)

(72) Inventors: Chuanan Zhang, Shenzhen (CN); Kun Zeng, Chengdu (CN); Yinggang Du, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 214 days.

(21) Appl. No.: 18/309,238

(22) Filed: Apr. 28, 2023

(65) Prior Publication Data

US 2023/0268661 A1 Aug. 24, 2023

Related U.S. Application Data

(63) Continuation of application No. PCT/CN2021/129357, filed on Nov. 8, 2021.

(30) Foreign Application Priority Data

Nov. 6, 2020 (CN) ........................ 202011231730.4

(51) Int. Cl.
*H01Q 3/46* (2006.01)
*H01Q 15/00* (2006.01)
(Continued)

(52) U.S. Cl.
CPC ............ *H01Q 3/46* (2013.01); *H01Q 15/002* (2013.01); *H01Q 15/0086* (2013.01);
(Continued)

(58) Field of Classification Search
CPC .... H01Q 3/46; H01Q 15/002; H01Q 15/0026; H01Q 15/0066; H01Q 15/0086;
(Continued)

(56) References Cited

U.S. PATENT DOCUMENTS

| | | | | |
|---|---|---|---|---|
| 2017/0099041 A1 | | 4/2017 | Wall | |
| 2022/0102863 A1 | * | 3/2022 | Shekhar | H01Q 9/0485 |

FOREIGN PATENT DOCUMENTS

| | | |
|---|---|---|
| CN | 106450765 A | 2/2017 |
| CN | 107591625 A | 1/2018 |

(Continued)

*Primary Examiner* — Robert Karacsony
(74) *Attorney, Agent, or Firm* — Slater Matsil, LLP

(57) ABSTRACT

This application provides a liquid crystal metasurface antenna apparatus and a communication apparatus. The liquid crystal metasurface antenna apparatus includes a liquid crystal metasurface reflection plate and a feed source, where the liquid crystal metasurface reflection plate includes a plurality of liquid crystal antenna units; the liquid crystal antenna unit at least includes a plurality of oscillators and two layers of dielectric plates; the plurality of oscillators are disposed between the two layers of dielectric plates; the plurality of oscillators include a horizontal oscillator pair and/or a vertical oscillator pair; and each oscillator includes a left arm, a right arm, and a capacitor, the left arm and the right arm are connected through the capacitor, and a liquid crystal material is filled in a space enclosed by the left arm, the right arm, and the capacitor.

20 Claims, 19 Drawing Sheets

(51) Int. Cl.
*H01Q 19/10* (2006.01)
*H01Q 21/24* (2006.01)
*H01Q 21/26* (2006.01)

(52) U.S. Cl.
CPC ........... *H01Q 19/10* (2013.01); *H01Q 21/245* (2013.01); *H01Q 21/26* (2013.01)

(58) Field of Classification Search
CPC .. H01Q 19/10; H01Q 19/108; H01Q 21/0018; H01Q 21/24; H01Q 21/245; H01Q 21/26
See application file for complete search history.

(56) References Cited

FOREIGN PATENT DOCUMENTS

| | | | |
|---|---|---|---|
| CN | 108711669 | A | 10/2018 |
| CN | 111786090 | A | 10/2020 |

* cited by examiner

LIQUID CRYSTAL METASURFACE ANTENNA APPARATUS AND COMMUNICATION APPARATUS

CROSS-REFERENCE TO RELATED APPLICATIONS

This application is a continuation of International Application No. PCT/CN2021/129357, filed on Nov. 8, 2021, which claims priority to Chinese Patent Application No. 202011231730.4, filed on Nov. 6, 2020. The disclosures of the aforementioned applications are hereby incorporated by reference in their entireties.

TECHNICAL FIELD

This application relates to the field of communication, and in particular, to a liquid crystal metasurface antenna apparatus and a communication apparatus.

BACKGROUND

With the development of communication technologies, an antenna, as a carrier for transmitting and receiving electromagnetic waves, has become an indispensable part of any complete communication system. In a high-frequency millimeter-wave communication network, information transmission with a large bandwidth and a high capacity needs to be implemented. In addition, with emergence of a multi-standard communication device, a narrowband antenna cannot meet a requirement of an existing scenario, and a wide-band antenna and a multi-band antenna are increasingly widely applied.

To achieve long-distance transmission, high-frequency millimeter-wave antennas need to be arrayed. The array antennas have an advantage of high gain, but also have disadvantages of a narrow beam width and small coverage. To resolve a coverage problem of a high-gain antenna, a phased-array antenna is usually used. As a conventional beam scanning antenna, the phased-array antenna has always been a research hotspot in the academic and industrial circles. However, the phased-array antenna has disadvantages of a complex system architecture and high costs, and system performance is highly dependent on a core chip. To break through architecture constraints of conventional beam scanning antennas, a liquid crystal metasurface antenna is one important approach.

SUMMARY

This application provides a liquid crystal metasurface antenna apparatus and a communication apparatus. A liquid crystal locally loaded architecture system is used, so that a loss of a liquid crystal antenna can be reduced, and different frequencies can be independently controlled. In addition, not only a beam scanning characteristic can be implemented, but also polarization reconstruction can be implemented. Moreover, an operating bandwidth of an antenna can be improved, so that the antenna can work in a dual-band or wideband mode. Besides, the antenna apparatus has a regular or irregular arrangement characteristic, and array arrangement is more flexible.

To achieve the foregoing objectives, the following technical solutions are used in embodiments of this application:

According to a first aspect, this application provides a liquid crystal metasurface antenna apparatus. The liquid crystal metasurface antenna apparatus includes a liquid crystal metasurface reflection plate and a feed source, where the liquid crystal metasurface reflection plate includes a plurality of liquid crystal antenna units; the liquid crystal antenna unit at least includes a plurality of oscillators and two layers of dielectric plates; the plurality of oscillators are disposed between the two layers of dielectric plates; the plurality of oscillators include a horizontal oscillator pair and/or a vertical oscillator pair; and each oscillator includes a left arm, a right arm, and a capacitor, the left arm and the right arm are connected through the capacitor, and a liquid crystal material is filled in a space enclosed by the left arm, the right arm, and the capacitor.

In a possible implementation, the horizontal oscillator pair includes a first horizontal oscillator and a second horizontal oscillator, and the horizontal oscillators are in a horizontal direction; and the vertical oscillator pair includes a first vertical oscillator and a second vertical oscillator, and the vertical oscillators are in a vertical direction.

In a possible implementation, the horizontal oscillator pair has a vertical polarization characteristic; and the vertical oscillator pair has a horizontal polarization characteristic.

In the foregoing implementation, the oscillators include horizontal oscillators and vertical oscillators, the horizontal oscillator pair has a vertical polarization characteristic, and the vertical oscillator pair has a horizontal polarization characteristic, so that the liquid crystal antenna unit has two polarization components, thereby having a polarization reconstructable characteristic.

In a possible implementation, the first horizontal oscillator and the second horizontal oscillator are equal-length or unequal-length; and the first vertical oscillator and the second vertical oscillator are equal-length or unequal-length.

In a possible implementation, when the first horizontal oscillator and the second horizontal oscillator are unequal-length, the liquid crystal antenna unit is in a dual-band mode or a wideband mode; and when the first vertical oscillator and the second vertical oscillator are unequal-length, the liquid crystal antenna unit is in the dual-band mode or the wideband mode.

In the foregoing implementation, when the first horizontal oscillator and the second horizontal oscillator in the horizontal oscillator pair are unequal-length, by changing relative lengths of the first horizontal oscillator and the second horizontal oscillator, the liquid crystal antenna unit may be in the dual-band or wideband mode, thereby improving the operating bandwidth of the antenna. Similarly, when the two oscillators of the vertical oscillator pair are unequal-length, by changing relative lengths of the first vertical oscillator and the second vertical oscillator, the liquid crystal antenna unit may be in the dual-band or wideband mode, thereby improving the operating bandwidth of the antenna.

In a possible implementation, when the first horizontal oscillator and the second horizontal oscillator are equal-length, the antenna unit is in a single-band mode; and when the first vertical oscillator and the second vertical oscillator are equal-length, the antenna unit is in the single-band mode.

In a possible implementation, when the first horizontal oscillator and the first vertical oscillator are equal-length:

when a phase difference of the liquid crystal material is 0° or 180°, a polarization characteristic of the liquid crystal antenna unit is 45° polarization or −45° polarization; when the phase difference of the liquid crystal material is −90° or 90°, the polarization characteristic of the liquid crystal antenna unit is left-handed circular polarization or right-handed circular polarization; and when the phase difference of the liquid crystal material is not equal to 0°, 90°, −90°, or 180°, the polarization characteristic of the liquid crystal antenna unit is left-handed elliptic polarization or right-handed elliptic polarization.

In the foregoing implementation, by changing the phase difference of the liquid crystal material, the liquid crystal antenna unit may be in different polarization mode, thereby implementing the polarization reconstructable characteristic of the antenna.

In a possible implementation, a loading mode of the liquid crystal material is locally loaded.

In the foregoing implementation, the liquid crystal material is in a locally loaded mode, so that each local region of the liquid crystal metasurface antenna apparatus can be independently controlled, thereby having better control flexibility and better electrical performance.

In a possible implementation, filling manners of liquid crystal materials of the plurality of oscillators are the same or different.

In the foregoing implementation, the filling manners of the liquid crystal materials of the plurality of oscillators are not limited, thereby improving diversity and flexibility of a design process.

In a possible implementation, the filling manner includes full filling, partial filling, and overflow filling.

In the foregoing implementation, the filling manner may be any one or more of full filling, partial fulling, and overflow filling, thereby improving diversity and flexibility of a design process.

In a possible implementation, a shape of the dielectric plate is not unique, and may be at least one of a square, a rectangle, a circle, an ellipse, a polygon, or any shape.

In the foregoing implementation, the shape of the dielectric plate is not limited, thereby improving diversity of a design process of the dielectric plate.

In a possible implementation, the feed source is located at a focal point of the liquid crystal metasurface reflection plate.

In the foregoing implementation, the feed source is located at the focal point of the liquid crystal metasurface reflection plate, to ensure uniform illumination on the liquid crystal metasurface reflection plate, thereby improving antenna efficiency.

In a possible implementation, the oscillators in all the liquid crystal antenna units are arranged in a same manner.

In the foregoing implementation, because the oscillators in all the liquid crystal antenna units may be arranged in a same manner, complexity of an antenna architecture is reduced, and further, production efficiency can be improved and production costs can be reduced.

According to a second aspect, this application provides a communication apparatus, including the foregoing liquid crystal metasurface antenna apparatus. For technical effects brought by the second aspect, refer to beneficial effects of the corresponding liquid crystal metasurface antenna apparatus provided in the first aspect. Details are not described herein again.

DETAILED DESCRIPTION OF ILLUSTRATIVE EMBODIMENTS

Figure 1:
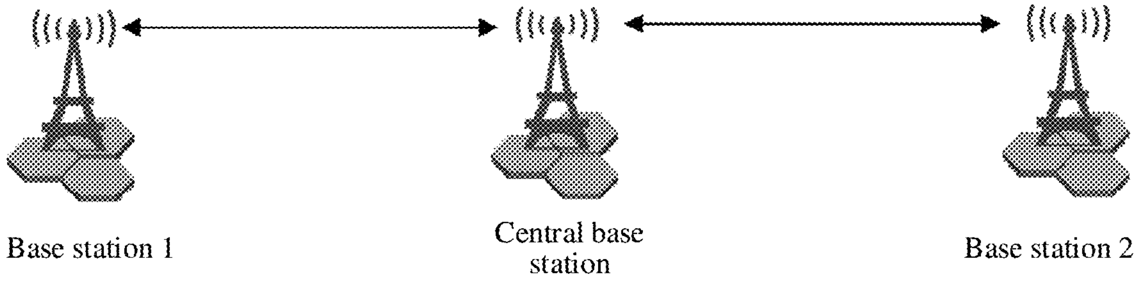
FIG. 1 is a schematic diagram of an architecture of a communication system according to an embodiment of this application.

In the specification and accompanying drawings of this application, the terms "first", "second", and the like are intended to distinguish between different objects or distinguish between different processing of a same object, but do not indicate a particular sequence of the objects. In addition, the terms "include", "have", or any other variant thereof in descriptions of this application are intended to cover non-exclusive inclusion. For example, a process, method, system, product, or device that includes a series of steps or units is not limited to the listed steps or units, but optionally further includes other steps or units that are not listed, or optionally further includes another inherent step or unit of the process, method, product, or device. In embodiments of this application, "a plurality of" includes two or more, and "system" and "network" may be replaced with each other. In embodiments of this application, terms such as "example" or "for example" are for representing giving an example, an illustration, or a description. Any embodiment or design scheme described as "example" or "for example" in embodiments of this application should not be explained as being more preferred or having more advantages than another embodiment or design scheme. Exactly, use of the term such as "example" or "for example" is intended to present a relative concept in a specific manner.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

Terms used in implementations of this application are only for explaining specific embodiments of this application, but are not intended to limit this application.

To facilitate understanding of embodiments of this application, the following describes terms related to embodiments of this application:

1. Metasurface antenna: The metasurface antenna is made of an electromagnetic metasurface material, and forms an electromagnetic structure having an antenna radiation characteristic. The electromagnetic metasurface material is a material designed manually, usually has a certain arrangement rule, and has a special attribute that a natural material does not have.
2. Feed source: The feed source is a basic component of a reflector or transmission plane antenna, and is usually a low-gain antenna. As a primary radiator, the feed source converts a bound electromagnetic wave into radiated electromagnetic wave energy and radiates the energy to the reflector or transmission plane antenna, thereby forming a high-gain reflector antenna or transmission plane antenna. Common feed sources include a horn antenna, a dipole antenna, a patch antenna, and the like.
3. Oscillator: The oscillator is usually an antenna oscillator, and is a basic unit that forms an antenna radiation structure. A length of the oscillator determines an operating characteristic of an antenna. Common oscillators include a half-wave oscillator, a full-wave oscillator, and the like.
4. Liquid crystal: A material attribute of the liquid crystal is a material that can be electrically controlled. When the liquid crystal material is subjected to a bias voltage, molecules of the material are subjected to an electric field force, and the molecules are re-arranged in an axial arrangement sequence. As a result, a dielectric constant of the liquid crystal changes, and a phase shift characteristic is generated. Currently, for a commonly used liquid crystal material, when a bias voltage ranges from 0 V to 20 V, a change range of a dielectric constant of the liquid crystal is from 2.5 to 3.5.

The following describes embodiments of this application with reference to the accompanying drawings in embodiments of this application.

A liquid crystal metasurface antenna apparatus provided in embodiments of this application may be applied to various communication systems, for example, a satellite communication system, an Internet of Things (IoT), a Narrowband Internet of Things (NB-IoT) system, a Global System for Mobile Communications (GSM), an Enhanced Data rates for GSM Evolution (EDGE) system, a Wideband Code Division Multiple Access (WCDMA) system, a Code Division Multiple Access 2000 (CDMA2000) system, a Time Division-Synchronous Code Division Multiple Access (TD-SCDMA) system, a long term evolution (LTE) system, and a fifth generation (5G) communication system such as 5G new radio (NR), and three application scenarios of a 5G mobile communication system: Enhanced Mobile Broadband (eMBB), Ultra-Reliable and Low-Latency Communication (uRLLC), and Massive Machine Type Communication (, mMTC), a Device-to-Device (D2D) communication system, a Machine-to-Machine (M2M) communication system, an Internet of Vehicles communication system, or another or a future communication system, which is not specifically limited in this embodiment of this application.

Figure 2:
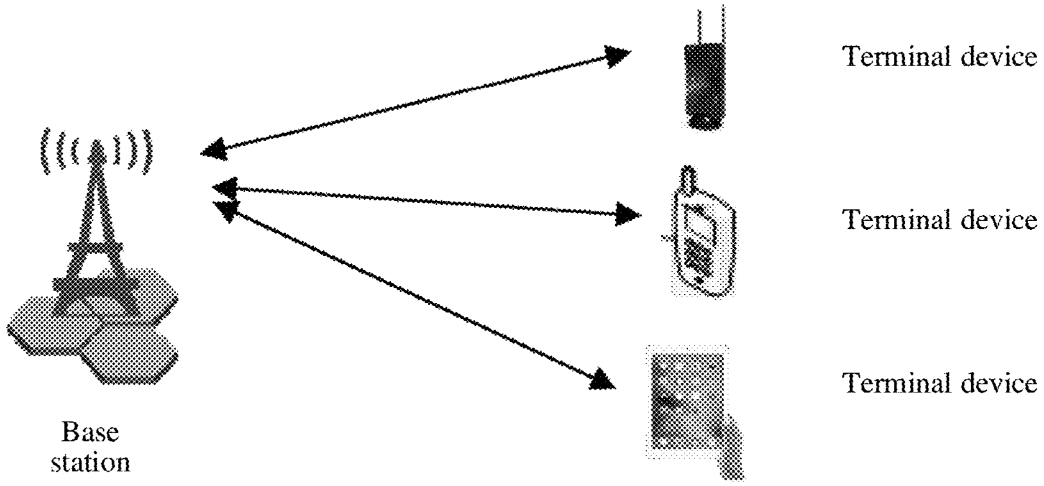
FIG. 2 is a schematic diagram of an architecture of a communication system according to an embodiment of this application.

For ease of understanding of embodiments of this application, for example, network architectures shown in FIG. 1 and FIG. 2 are for describing application scenarios to which embodiments of this application are applied. The network architecture may be applied to the foregoing communication systems. The network architecture shown in FIG. 1 is a communication architecture between network devices (represented as base stations in FIG. 1). For example, the liquid crystal metasurface antenna apparatus in this embodiment of this application may be applied to a ground base station, to implement communication between base stations, and has a beamforming capability. When the liquid crystal metasurface antenna apparatus is for communication between base stations, point-to-multipoint communication may be implemented, and one central base station may be connected to a plurality of edge base stations. The network architecture shown in FIG. 2 is a communication architecture between a network device and a terminal device. The liquid crystal metasurface antenna apparatus provided in this embodiment of this application may be for communication between a network device (represented as a base station in FIG. 2) and a terminal user. The liquid crystal metasurface antenna apparatus has a beamforming capability, and can increase sector coverage. One base station can cover a plurality of sector users. In addition, the base station has a dual-band characteristic, and can support a plurality of pieces of standard information (for example, 4G information and 5G information). Moreover, the liquid crystal metasurface antenna apparatus has an advantage of polarization reconstructable, and can expand a signal transmission capacity. There may be one or more network devices, and there may be one or more terminal devices (as shown in FIG. 2, there are three terminal devices). In this embodiment of this application, types and quantities of the network devices and the terminal devices are not limited.

The terminal device may include user equipment (UE), a wireless terminal device, a mobile terminal device, a Device-to-Device (D2D) terminal device, a Vehicle-to-Everything (V2X) terminal device, a Machine-to-Machine/Machine Type Communication (M2M/MTC) terminal device, an Internet of Things (IoT) terminal device, a light terminal device (light UE), a subscriber unit, a subscriber station, a mobile station, a remote station, an access point (AP), a remote terminal, an access terminal, a user terminal, a user agent, or a user device. For example, the terminal device may include a mobile phone (or referred to as a "cellular" phone), a computer with a mobile terminal device, and a portable, pocket-sized, hand-held, and computer built-in mobile device. For example, the terminal device may be a device such as a personal communications service (PCS) phone, a cordless phone, a session initiation protocol (SIP) phone, a wireless local loop (WLL) station, or a personal digital assistant (PDA). The terminal device may alternatively include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device or an intelligent wearable device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that are dedicated to only one type of application function and need to collaboratively work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal device is also referred to as an on-board unit (OBU).

In embodiments of this application, the terminal device may further include a relay (relay). Alternatively, it is understood as that any device that can perform data communication with a base station may be considered as a terminal device.

In embodiments of this application, an apparatus configured to implement a function of the terminal device may be a terminal device, or may be an apparatus, for example, a chip system, that can support the terminal device in implementing the function. The apparatus may be mounted in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal device is the terminal device.

The network device includes, for example, an access network (AN) device, for example, a base station (for example, an access point), and may be a device that communicates with a wireless terminal device over an air interface through one or more cells in an access network. Alternatively, for example, a network device in a Vehicle-to-Everything (V2X) technology is a roadside unit (RSU). The base station may be configured to mutually convert a received over-the-air frame and an IP packet and serve as a router between the terminal device and a remaining part of the access network, where the remaining part of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolved NodeB) in a long term evolution (LTE) system or an long term evolution-advanced (LTE-A) system, or may include a next generation NodeB (gNB) in a fifth generation (5G) mobile communication technology new radio (NR) system, or may include a central unit (CU) and a distributed unit (DU) in a cloud radio access network (Cloud RAN) system, or may be an apparatus carrying a function of the network device in a further communication system. This is not limited in embodiments of this application.

The network device may further include a core network device. The core network device includes, for example, an access and mobility management function (AMF), a user plane function (UPF), and the like.

The network device may alternatively be an apparatus that carries a function of the network device in Device-to-Device (D2D) communication, Machine-to-Machine (M2M) communication, the Internet of Vehicles, or a satellite communication system.

It should be noted that only communication manners between some network elements are listed above, and other network elements may also communicate with each other in some connection manners. Details are not described again in this embodiment of this application.

The system architecture and application scenarios described in embodiments of this application are intended to describe the technical solution in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

Figure 3:
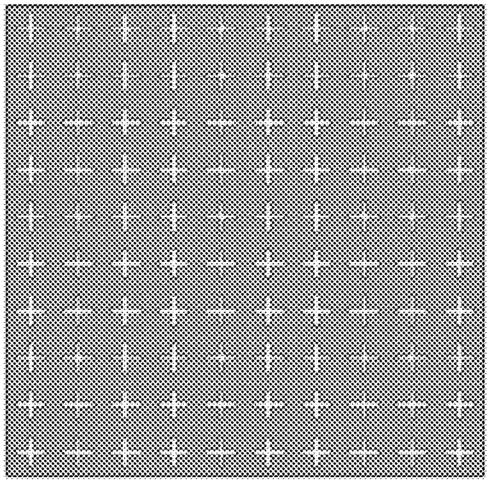
FIG. 3 is a schematic diagram of an existing metasurface antenna according to an embodiment of this application.

FIG. 3 shows a structure of an existing metasurface antenna based on a printed circuit board (PCB) system. The metasurface antenna prints a cross metal pattern on a surface of a common PCB, and the cross structure pattern on the surface of the common PCB has a dual polarization characteristic, and can implement a horizontal polarization mode and a vertical polarization mode at the same time. The structure is a typical dual-polarized metasurface structure. However, the structure is a single-resonance architecture. As a result, congenital disadvantages of the structure are that: (1) An operating frequency band is very narrow. (2) In addition, the metasurface antenna can only implement a fixed beam, but cannot implement a beam scanning characteristic.

Figure 4:
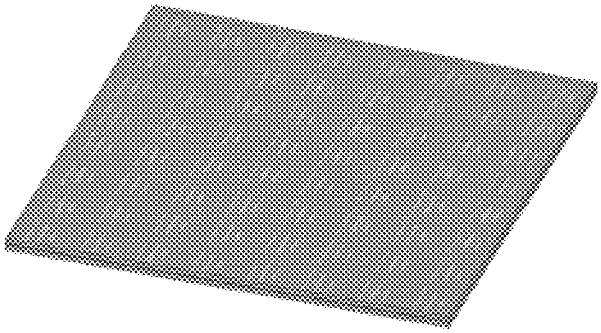
FIG. 4 is a schematic diagram of an existing liquid crystal metasurface antenna according to an embodiment of this application.
Figure 5:
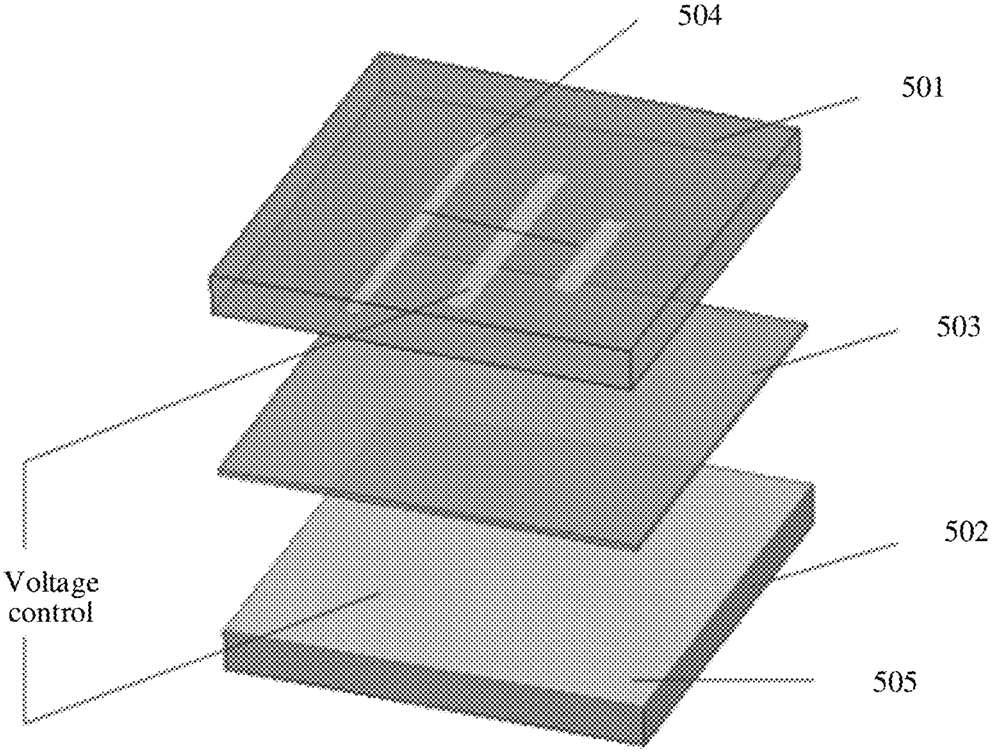
FIG. 5 is a schematic diagram of an existing liquid crystal metasurface unit according to an embodiment of this application.

FIG. 4 shows an existing liquid crystal metasurface antenna. The liquid crystal metasurface antenna includes two lower dielectric plates 501 and 502 and an intermediate liquid crystal material layer 503. FIG. 5 shows a structure of a liquid crystal metasurface unit of the liquid crystal metasurface antenna. A metal pattern 504 is on a lower surface of the upper dielectric plate 501, and a metal pattern 505 is on an upper surface of the lower dielectric plate 502, which are also referred to as metal grounds. The liquid crystal material layer 503 is loaded between the two metal patterns 504 and 505. The upper and lower metal patterns 504 and 505 form an electrode of the liquid crystal material layer. A dielectric constant of a liquid crystal material may be adjusted by applying different voltages to the electrode, so as to implement a beam scanning characteristic of an antenna array. The metal pattern 504 printed on the lower surface of the upper dielectric plate 501 is a three-oscillator structure. Therefore, the structure has three resonance frequencies, that is, the structure has a multi-resonance structure. Therefore, the antenna has a broadband characteristic. However, the liquid crystal metasurface antenna uses an architecture in which a liquid crystal material is loaded as a whole, and consequently has congenital disadvantages: (1) A liquid crystal loading area is too large, and consequently a loss of the liquid crystal material in the metasurface structure is very serious. (2) In a multi-frequency operation mode, all frequencies are controlled synchronously. (3) Polarization cannot be reconstructed.

To resolve the foregoing problems, embodiments of this application provide a liquid crystal metasurface antenna apparatus and a communication apparatus. The liquid crystal metasurface antenna apparatus uses a liquid crystal locally loaded architecture system, so that a loss of a liquid crystal antenna can be reduced, and different frequencies can be independently controlled. In addition, not only a beam scanning characteristic can be implemented, but also polarization reconstruction can be implemented. Moreover, an operating bandwidth of an antenna can be improved, so that the antenna can work in a dual-band or wideband mode. Besides, the antenna apparatus has a regular or irregular arrangement characteristic, and array arrangement is more flexible.

The following specifically describes the liquid crystal metasurface antenna apparatus and the communication apparatus that are provided in this application with reference to the accompanying drawings.

Figure 6:
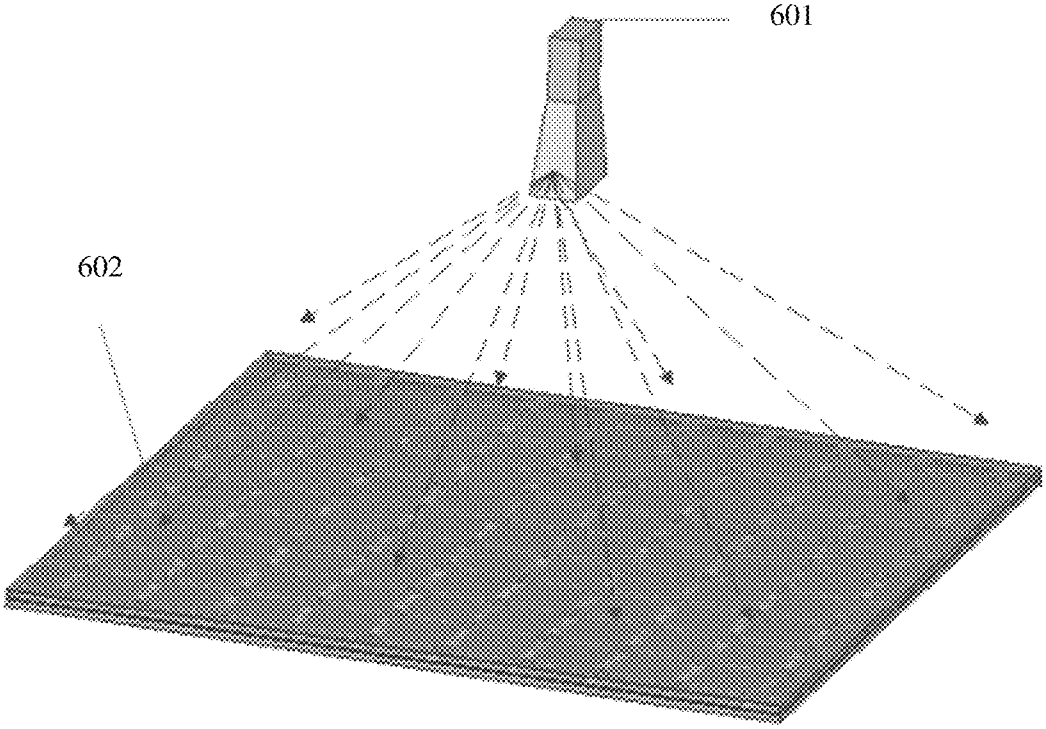
FIG. 6 is a schematic diagram of an overall structure of a liquid crystal metasurface antenna apparatus according to an embodiment of this application.

FIG. 6 shows an overall structure of a liquid crystal metasurface antenna apparatus according to an embodiment of this application. The antenna apparatus includes a liquid crystal metasurface reflection plate 602 and a feed source 601, where the liquid crystal metasurface reflection plate 602 includes a plurality of liquid crystal antenna units.

Figure 7:
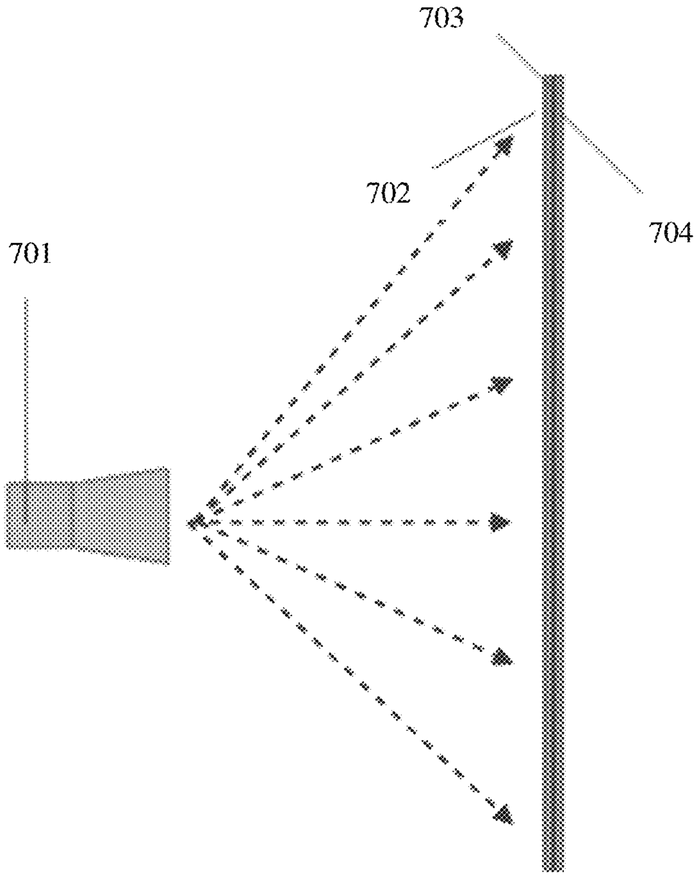
FIG. 7 is a schematic diagram of an overall structure of a liquid crystal metasurface antenna apparatus according to an embodiment of this application.

FIG. 7 still shows an overall structure of a liquid crystal metasurface antenna apparatus according to an embodiment of this application. Specifically, 701 is a feed source, and a commonly used feed source includes but is not limited to a horn antenna or a dipole antenna; 702 and 704 are dielectric plates, and a commonly used dielectric plate includes but is not limited to a PCB or glass; and 703 is a hybrid layer, and the hybrid layer includes a liquid crystal material and a metal pattern, where 702, 703, and 704 jointly form a liquid crystal metasurface structure, that is, a metasurface reflection plate.

In a possible implementation, the feed source 701 is located at a focal point of the liquid crystal metasurface reflection plate, that is, the feed source 701 located at a focal point of an antenna is irradiated on the liquid crystal metasurface structure, and the metasurface structure reflects, converges, and forms an electromagnetic wave in a corresponding polarization manner. According to the manner in which the feed source 701 is located at the focal point of the liquid crystal metasurface plate, uniform illumination on the liquid crystal metasurface reflection plate can be ensured, thereby improving antenna efficiency.

In a possible implementation, a minimum unit of the liquid crystal metasurface antenna apparatus provided in this embodiment of this application is also referred to as a liquid crystal antenna unit. The liquid crystal antenna unit at least includes a plurality of oscillators and two layers of dielectric plates. The plurality of oscillators are disposed between the two layers of dielectric plates. The plurality of oscillators include a horizontal oscillator pair and/or a vertical oscillator pair. Each oscillator includes a left arm, a right arm, and a capacitor, the left arm and the right arm are connected through the capacitor, and a liquid crystal material is filled in a space enclosed by the left arm, the right arm, and the capacitor.

Figure 8:
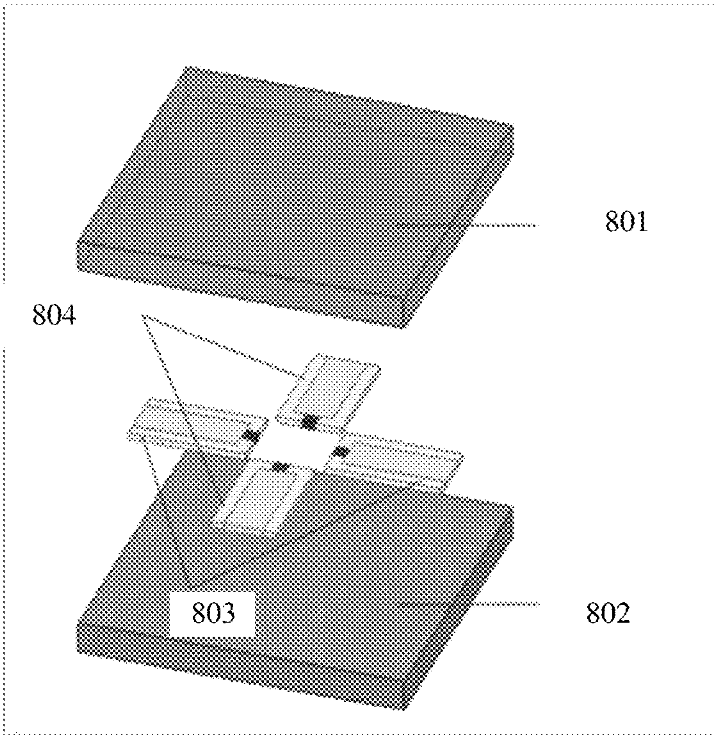
FIG. 8 is a schematic diagram of a structure of a liquid crystal antenna unit according to an embodiment of this application.

The liquid crystal antenna unit shown in FIG. 8 is merely an example. The liquid crystal antenna unit includes a first dielectric plate 801 and a second dielectric plate 802, and includes both a horizontal oscillator pair 803 and a vertical oscillator pair 804, that is, includes two horizontal oscillators and two vertical oscillators at the same time. However, the antenna unit in this embodiment of this application may include only one horizontal oscillator pair 803 or only one vertical oscillator pair 804, that is, include only two horizontal oscillators or only two vertical oscillators.

In a possible implementation, the horizontal oscillator pair includes a first horizontal oscillator and a second horizontal oscillator, and the horizontal oscillators are in a horizontal direction; and the vertical oscillator pair includes a first vertical oscillator and a second vertical oscillator, and the vertical oscillators are in a vertical direction.

Correspondingly, in a possible implementation, the horizontal oscillator pair has a vertical polarization characteristic; and the vertical oscillator pair has a horizontal polarization characteristic.

In other words, the liquid crystal antenna unit includes two stacked dielectric plates, a metal pattern is printed between the two dielectric plates, the metal pattern includes four oscillators, and the liquid crystal material is filled in the metal pattern. By adjusting a length of each oscillator, the liquid crystal antenna unit may work in a dual-band mode or a wideband mode.

Figure 9:
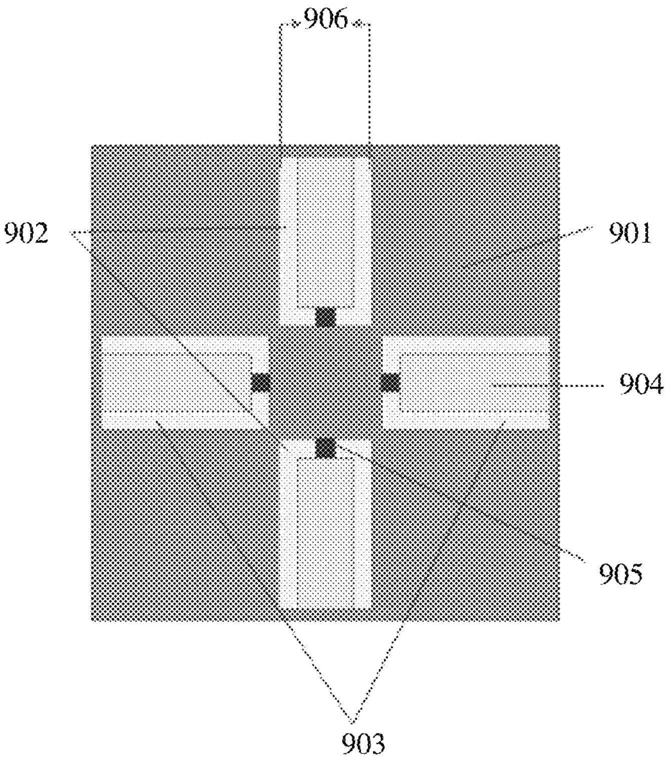
FIG. 9 is a cross-sectional view of a liquid crystal antenna unit according to an embodiment of this application.

FIG. 9 is a cross-sectional view of a liquid crystal antenna unit according to an embodiment of this application. 901 is a dielectric plate, and 902 includes two vertical oscillators located on upper and lower sides, that is, a first vertical oscillator and a second vertical oscillator form an oscillator pair. By adjusting lengths of the two oscillators, the liquid crystal antenna unit may work in a dual-band mode or a wideband mode. Similarly, 903 includes two horizontal oscillators located on left and right sides, that is, a first horizontal oscillator and a second horizontal oscillator form an oscillator pair. By adjusting lengths of the two oscillators, the liquid crystal antenna unit may work in a dual-band mode or a wideband mode. Each oscillator may be used as an electrode of a liquid crystal material 904, and is configured to load a control voltage 906 of the liquid crystal material 904. A direct current blocking capacitor 905 is welded on each oscillator, and an electric field may be generated inside each oscillator, to control a phase shift characteristic of the liquid crystal material 904.

In a possible implementation, the first horizontal oscillator and the second horizontal oscillator may be equal-length or may be unequal-length; and similarly, the first vertical oscillator and the second vertical oscillator may be equal-length or may be unequal-length.

In a possible implementation, when the first horizontal oscillator and the second horizontal oscillator are unequal-length, the liquid crystal antenna unit is in the dual-band mode or the wideband mode; and similarly, when the first vertical oscillator and the second vertical oscillator are unequal-length, the liquid crystal antenna unit is in the dual-band mode or the wideband mode.

Figure 10:
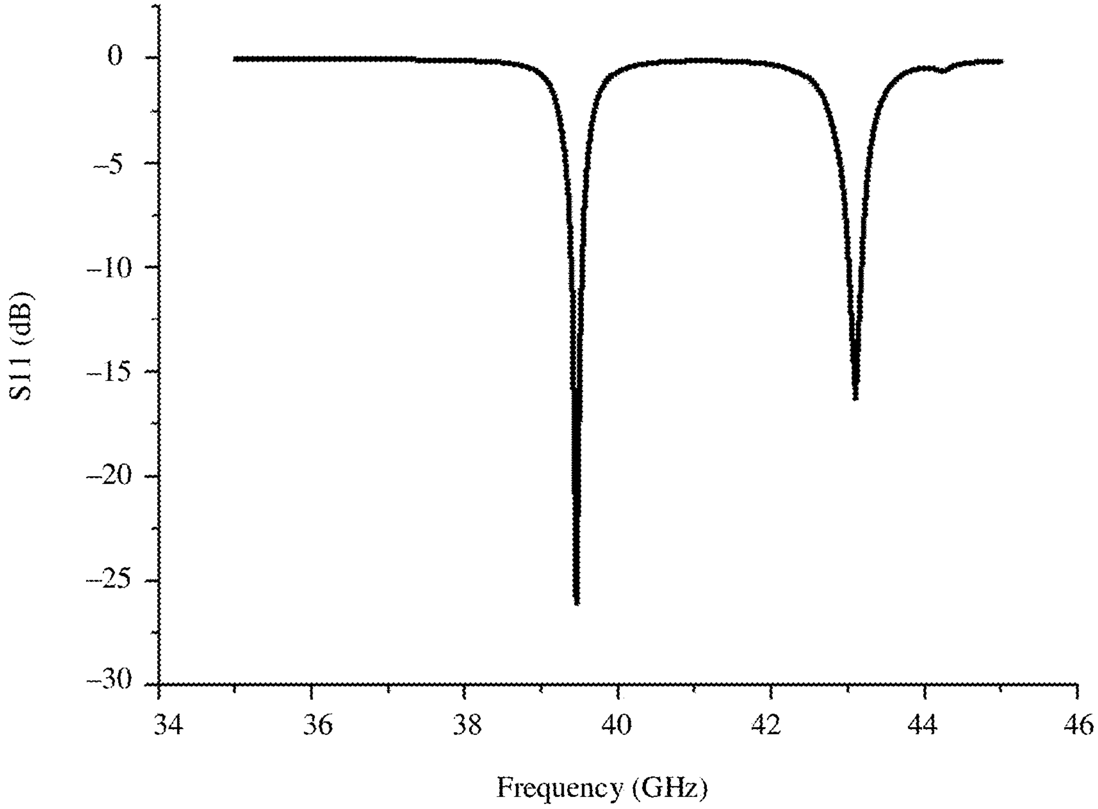
FIG. 10 is a simulation diagram of a liquid crystal antenna unit working in a dual-band mode according to an embodiment of this application.
Figure 11:
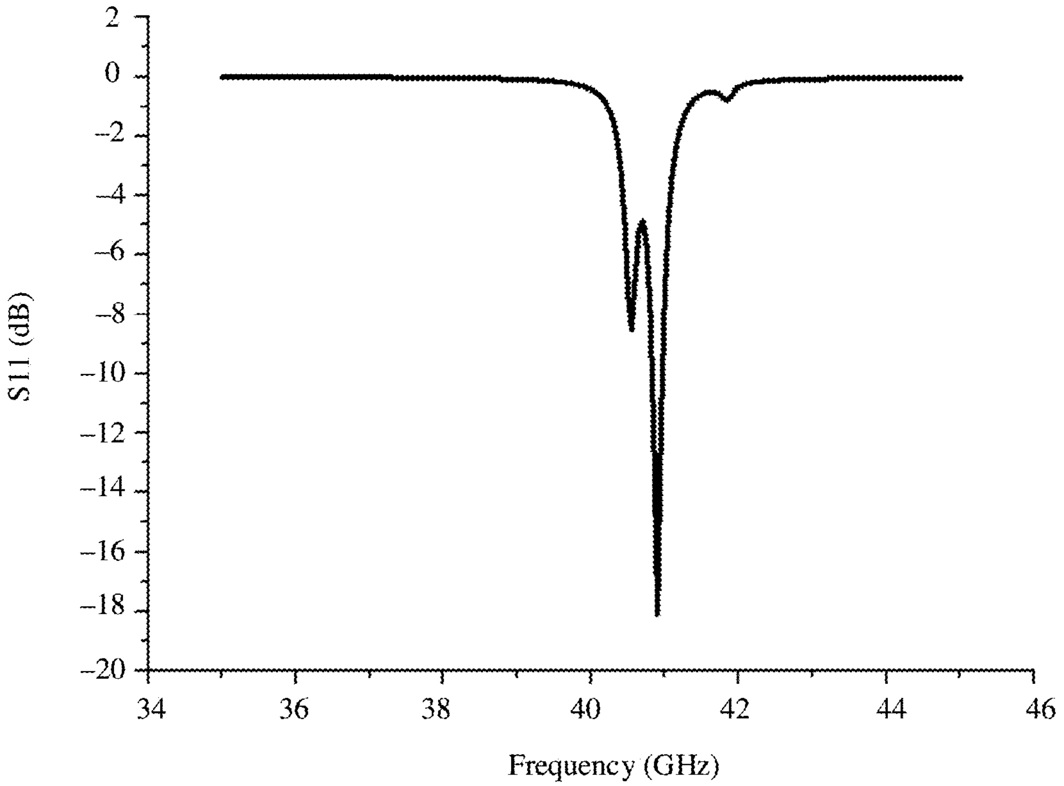
FIG. 11 is a simulation diagram of a liquid crystal antenna unit working in a wideband mode according to an embodiment of this application.

In other words, when the lengths of the oscillators in the horizontal oscillator pairs are not equal or the oscillators in the vertical oscillator pair are not equal, the liquid crystal unit may work in the dual-band or wideband mode. In brief, when a difference between lengths of two oscillators in an oscillator pair is large, the liquid crystal unit is in the dual-band mode. FIG. 10 is a simulation diagram of the liquid crystal unit in the dual-band mode. It can be apparently seen that in this case, the liquid crystal unit may simultaneously work in frequency bands of about 39.5 GHz and 43 GHz. When the length difference between the two oscillators in the oscillator pair is small, the liquid crystal unit is in the wideband mode. FIG. 11 is a simulation diagram of the liquid crystal unit in the wideband mode. It can be apparently seen that in this case, the liquid crystal unit may work in a frequency band range of about 40 GHz to 42 GHz.

It can be learned that, when the oscillators in the horizontal oscillators are unequal-length or the oscillators in the vertical oscillator pair are not equal, by changing the relative lengths of the first horizontal oscillator and the second horizontal oscillator, the liquid crystal antenna unit may be in the dual-band or wideband mode, thereby improving the operating bandwidth of the antenna.

Figure 12:
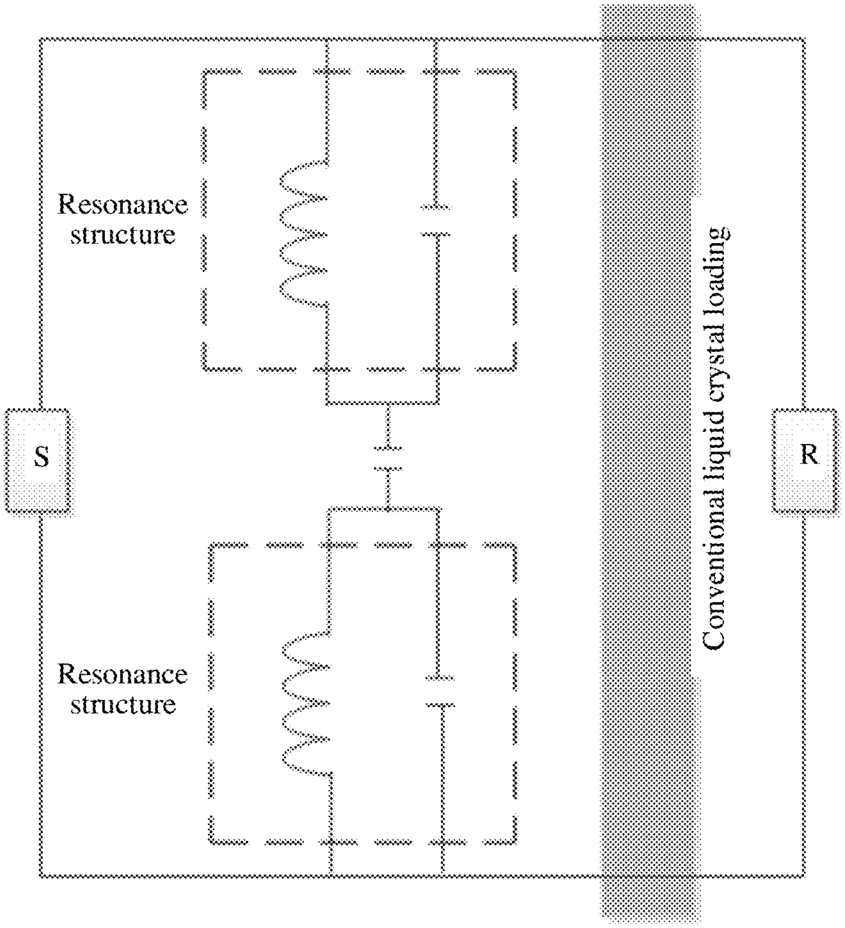
FIG. 12 is a schematic diagram of a liquid crystal loading topology structure of a conventional liquid crystal antenna according to an embodiment of this application.

In a conventional liquid crystal antenna architecture, the liquid crystal material needs to be loaded as a whole. The liquid crystal material is mainly loaded between a resonance structure and a load, and control a coupling relationship between the resonance structure and the load. A topology structure of the liquid crystal antenna is shown in FIG. 12. The corresponding coupling relationship varies as a control voltage of the liquid crystal changes, and therefore a phase shift characteristic of the liquid crystal antenna is generated. However, the conventional liquid crystal antenna uses an architecture in which the liquid crystal material is loaded as a whole, and consequently has a congenital disadvantage: a liquid crystal loading area is too large, and consequently a loss of the liquid crystal material in the metasurface structure is very serious.

Figure 13:
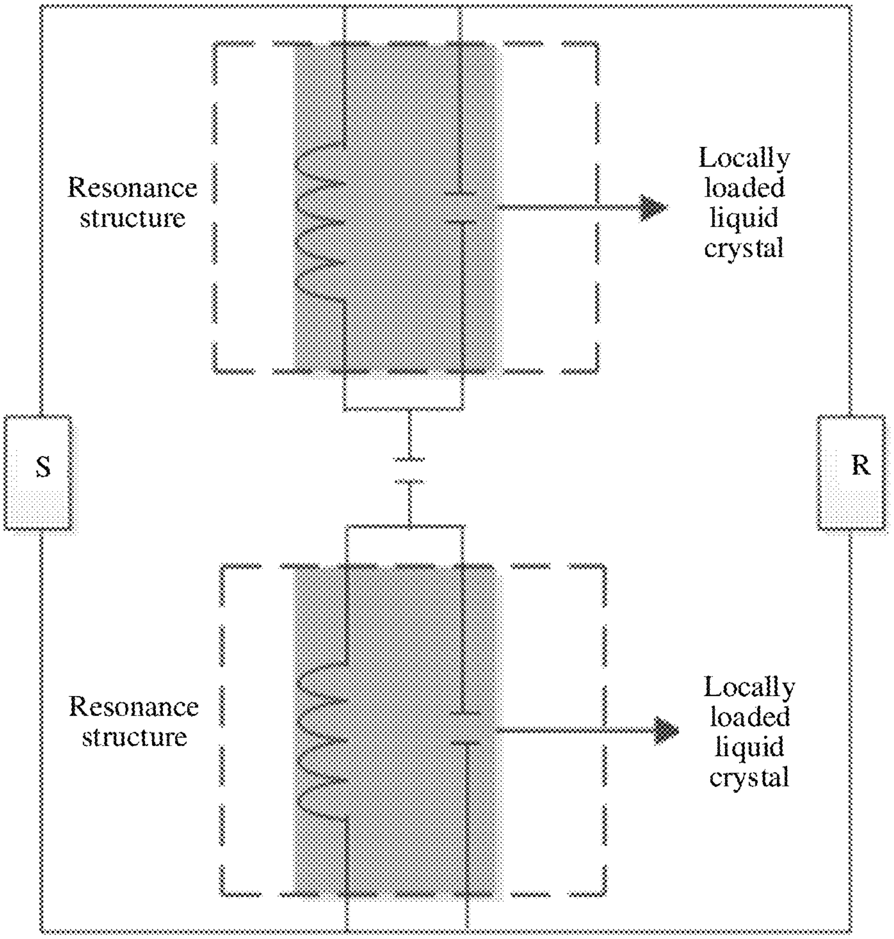
FIG. 13 is a schematic diagram of a liquid crystal locally loaded topology structure of a liquid crystal antenna according to an embodiment of this application.

In a possible implementation, the metasurface liquid crystal antenna apparatus in this embodiment of this application uses a manner in which liquid crystal is locally loaded, and the liquid crystal material is loaded at a position of a resonance structure. A topology structure of the metasurface liquid crystal antenna apparatus is shown in FIG. 13. The corresponding resonance characteristic varies as a control voltage of the liquid crystal changes, and therefore a phase shift characteristic of the liquid crystal antenna is generated. Compared with the conventional liquid crystal antenna, the liquid crystal metasurface antenna apparatus in this embodiment of this application has better control flexibility, and each local region may be independently controlled, thereby reducing a loss of the liquid crystal antenna and further having better electrical performance.

Figure 14:
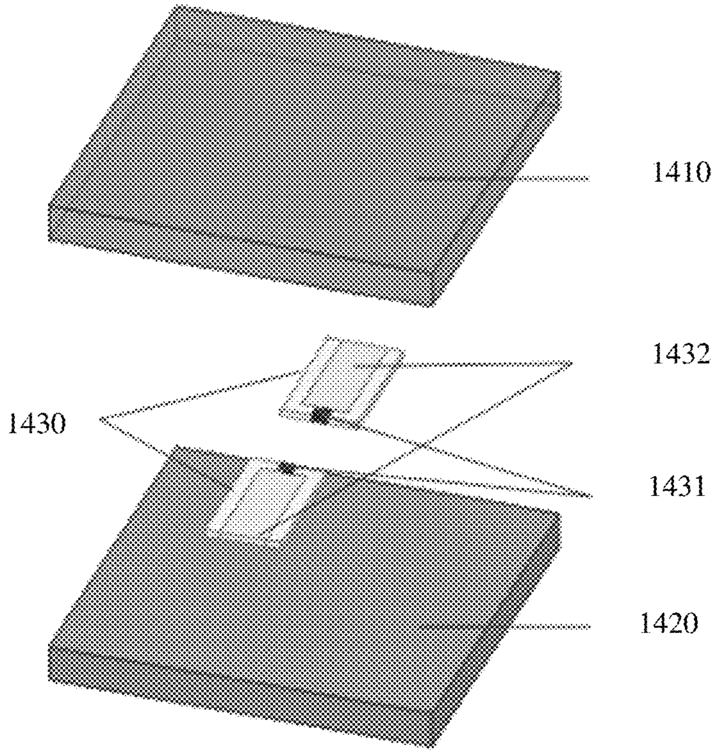
FIG. 14 is a schematic diagram of a structure of a single-polarized liquid crystal antenna unit according to an embodiment of this application.

In a possible implementation, this application provides a single-polarized liquid crystal antenna unit. As shown in FIG. 14, the single-polarized liquid crystal antenna unit includes only one pair of horizontal oscillators or one pair of vertical oscillators. The single-polarized liquid crystal antenna unit, also referred to as an antenna unit radiation structure, includes a first dielectric plate 1410, a second dielectric plate 1420, and two oscillators 1430. The two oscillators 1430 may form a horizontal oscillator pair or a vertical oscillator pair. Each oscillator 1430 includes a left arm, a right arm, and a capacitor, where both the left arm and the right arm may be a metal copper clad layer; a metal pattern formed by the left arm and the right arm is discontinuous, and a capacitor 1431 is welded at a disconnected notch to form a control electrode. A type of the capacitor includes but is not limited to a direct current blocking capacitor. A liquid crystal material 1432 is filled in a region enclosed by the left arm, the right arm, and the capacitor, and the liquid crystal material 1432 may exceed the region enclosed by the oscillator 1430. A control voltage of the liquid crystal material 1432 is loaded on two sides of the capacitor 1431, and as the control voltage changes, the liquid crystal material 1432 has a phase shift characteristic.

Figure 15:
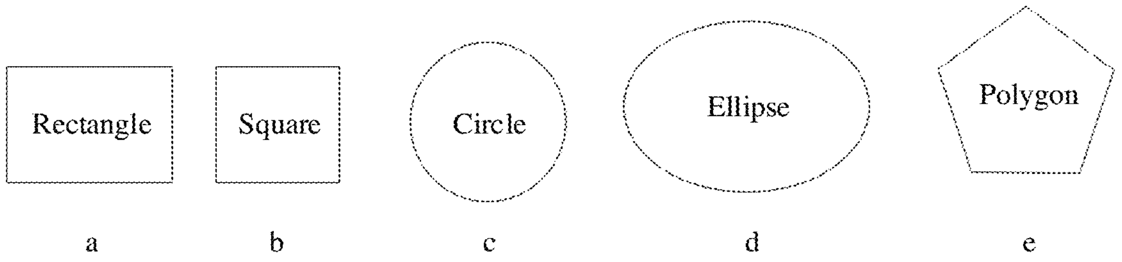
FIG. 15 is a schematic diagram of some shapes of a dielectric plate according to an embodiment of this application.

In a possible implementation, shapes of the first dielectric plate 1410 and the second dielectric plate 1420 are not unique. As shown in FIG. 15, each of the first dielectric plate 1410 and the second dielectric plate 1420 may be in a shape of a square (a in FIG. 15), a rectangle (b in FIG. 15), a circle (c in FIG. 15), an ellipse (d in FIG. 15), a polygon (e in FIG. 15), or another irregular shape. This is not limited in this embodiment of this application.

In the foregoing implementation, the shape of the dielectric plate is not limited, thereby improving diversity of a design process of the dielectric plate.

Figure 16:
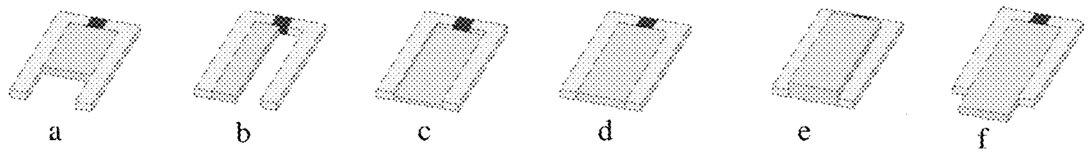
FIG. 16 is a schematic diagram of some filling forms of a liquid crystal material according to an embodiment of this application.

In a possible implementation, a manner in which the liquid crystal material is filled in a space or a region is not unique, and may be partial filling, full filling, or overflow filling. FIG. 16 shows several common filling manners. As shown in FIG. 16, a, b, and c are several different manners of partially filling the liquid crystal material, and may be partial filling in any dimension such as a length, a width, or a height. As shown in FIG. 16, d is a manner of fully filling the liquid crystal material, where the liquid crystal material exactly fills up the space or region. As shown in FIG. 16, e or f is several manners of filling the liquid crystal material in an overflow manner, and may be overflow filling in a dimension of a length or a height. It should be understood that the foregoing implementations are merely examples, and any simple variation based on this implementation falls within the protection scope of this embodiment of this application.

In the foregoing implementation, the filling manner may be any one or more of full filling, partial fulling, and overflow filling, thereby improving diversity and flexibility of a design process.

Figure 17:
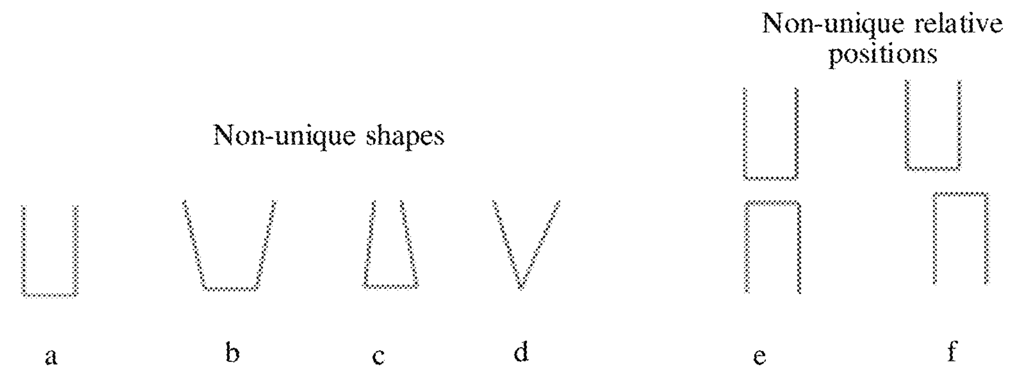
FIG. 17 is a schematic diagram of some shapes of a metal pattern according to an embodiment of this application.

In a possible implementation, a pattern of the oscillator or the metal copper clad layer is not unique, including a unique shape and a unique relative position. As shown in FIG. 17, a pattern enclosed by the oscillator or the metal copper clad layer may be in a shape of a rectangle (a in FIG. 17), a trapezoid (b and c in FIG. 17), a triangle (d in FIG. 17), or another irregular shape, which is not limited herein. The relative position of pattern of the oscillator or the metal copper clad layer may be in a form that is exactly opposite to each other shown by e in FIG. 17, or may be in a form that is staggered shown by f in FIG. 17, which is not limited herein. It should be understood that the foregoing implementations are merely examples, and any simple variation based on this implementation falls within the protection scope of this embodiment of this application.

Figure 18:
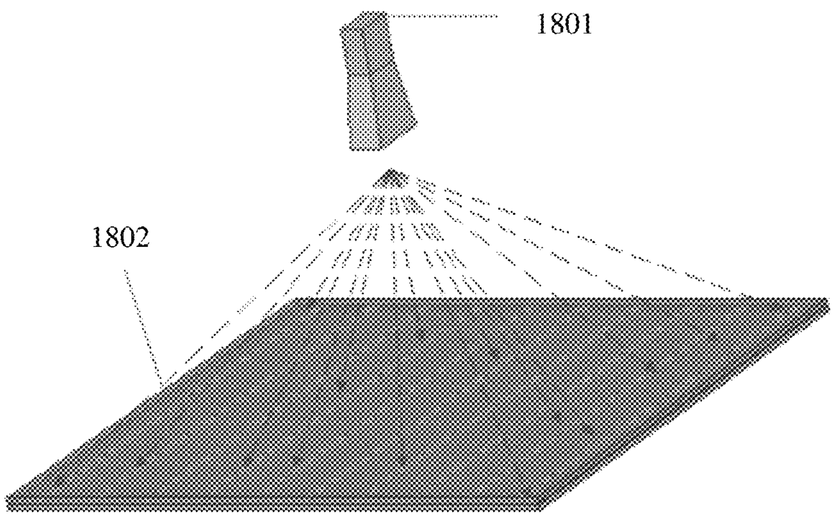
FIG. 18 is a schematic diagram of a structure of a single-polarized liquid crystal metasurface antenna apparatus according to an embodiment of this application.
Figure 19:
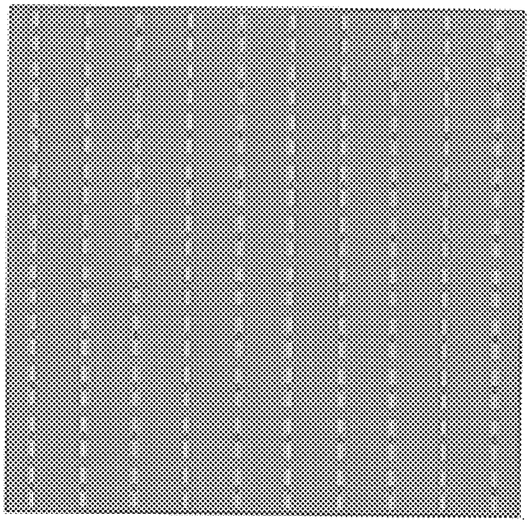
FIG. 19 is a schematic diagram of a liquid crystal metasurface array according to an embodiment of this application.

This application further provides a single-polarized liquid crystal metasurface antenna apparatus. As shown in FIG. 18, the single-polarized liquid crystal antenna apparatus includes a feed source 1801 and a liquid crystal metasurface array 1802. The liquid crystal metasurface array 1802 is formed by arranging the single-polarized liquid crystal metasurface antenna unit periodically, as shown in FIG. 19. It should be understood that, for technical effects brought by the single-polarized liquid crystal metasurface antenna apparatus, refer to the beneficial effects of the single-polarized liquid crystal metasurface antenna unit. Details are not described herein again.

Figure 20:
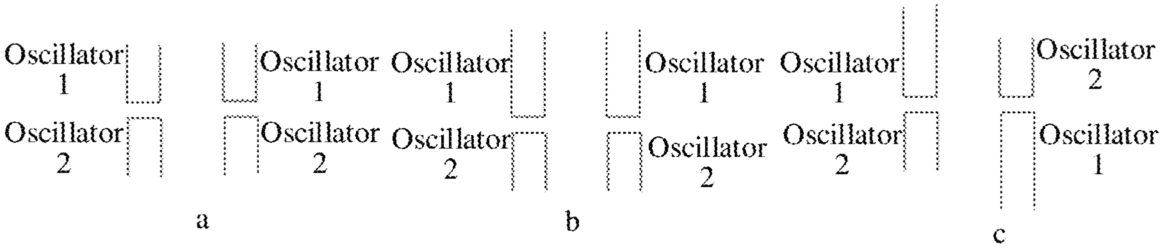
FIG. 20 is a schematic diagram of an arrangement manner of liquid crystal metasurface antenna units according to an embodiment of this application.

In a possible implementation, as shown in FIG. 20, when lengths of an oscillator 1 and an oscillator 2 are equal, in this case, the antenna is a single-resonance structure, and the metasurface antenna array is a uniform regular array, as shown by a in FIG. 20. When the oscillator 1 and the oscillator 2 are unequal-length, in this case, the antenna is a multi-resonance structure, and may work in a wideband mode or a multi-band mode. The metasurface antenna array may form a regular array, as shown by b in FIG. 20, or may form an irregular array, as shown by c in FIG. 20.

Figure 21:
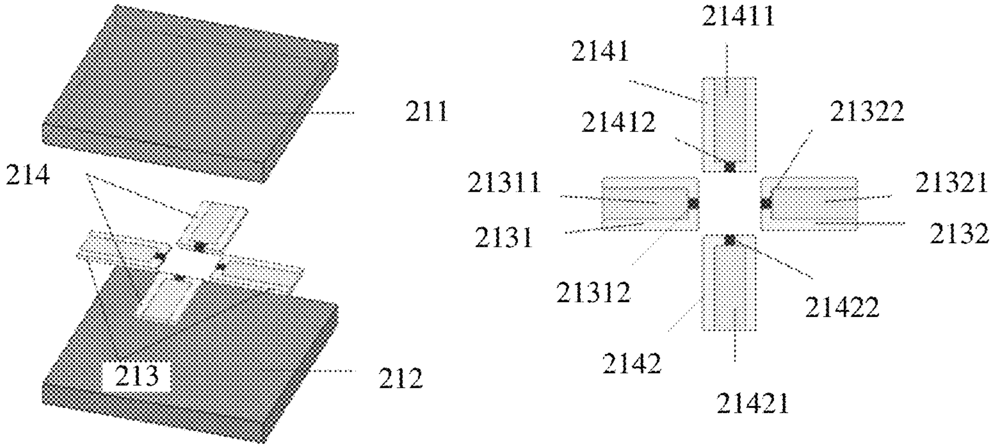
FIG. 21 is a schematic diagram of a structure of a polarization reconstructable liquid crystal antenna unit according to an embodiment of this application.

This application further provides a polarization reconstructable liquid crystal antenna unit. As shown in FIG. 21, the polarization reconstructable liquid crystal antenna unit includes two dielectric plates that are stacked on upper and lower sides and an intermediate liquid crystal layer. The antenna unit radiation structure includes a first dielectric plate 211, a second dielectric plate 212, a metal copper clad layer 213, and a metal copper clad layer 214. The metal copper clad layer 213 is a horizontal oscillator pair, the metal copper clad layer 214 is a vertical oscillator pair, and the metal copper clad layer is also referred to as a metal pattern. A pattern enclosed by the metal copper clad layer 213 has a vertical polarization characteristic, and is filled with liquid crystal materials 21311 and 21321 inside. The pattern of the metal copper clad layer 213 is discontinuous, and direct current blocking capacitors 21312 and 21322 are welded at disconnected notches to form control electrodes. Control voltages of the liquid crystal material 21311 and the liquid crystal material 21321 are loaded on two sides of the direct current blocking capacitors 21312 and 21322. As the control voltages change, the liquid crystal material 21311 and the liquid crystal material 21321 have a phase shift characteristic. Correspondingly, a pattern enclosed by the metal copper clad layer 214 has a horizontal polarization characteristic, and is filled with liquid crystal materials 21411 and 21421 inside. The pattern of the metal copper clad layer 214 is discontinuous, and direct current blocking capacitors 21412 and 21422 are welded at disconnected notches to form control electrodes. Control voltages of the liquid crystal material 21411 and the liquid crystal material 21421 are loaded on two sides of the direct current blocking capacitors 21412 and 21422. As the control voltages change, the liquid crystal material 21411 and the liquid crystal material 21421 have a phase shift characteristic.

In a possible implementation, shapes of the dielectric plates 211 and 212 are not unique. As shown in FIG. 15, each of the dielectric plates 211 and 212 may be in a shape of a square, a rectangle, a circle, an ellipse, a polygon, or another irregular shape. This is not limited in this embodiment of this application.

In the foregoing implementation, the shape of the dielectric plate is not limited, thereby improving diversity of a design process of the dielectric plate.

In a possible implementation, a manner in which the liquid crystal material is filled in a space or a region is not unique, and may be partial filling, full filling, or overflow filling. FIG. 16 shows several common filling manners. As shown in FIG. 16, a, b, and c are several different manners of partially filling the liquid crystal material, and may be partial filling in any dimension such as a length, a width, or a height. As shown in FIG. 16, d is a manner of fully filling the liquid crystal material, where the liquid crystal material exactly fills up the space or region. As shown in FIG. 16, e or f is several manners of filling the liquid crystal material in an overflow manner, and may be overflow filling in a dimension of a length or a height. It should be understood that the foregoing implementations are merely examples, and any simple variation based on this implementation falls within the protection scope of this embodiment of this application.

In the foregoing implementation, the filling manner may be any one or more of full filling, partial fulling, and overflow filling, thereby improving diversity and flexibility of a design process.

In a possible implementation, a pattern of the oscillator or the metal copper clad layer is not unique, including a unique shape and a unique relative position. As shown in FIG. 17, a pattern enclosed by the oscillator or the metal copper clad layer may be in a shape of a rectangle, a trapezoid, a triangle, or another irregular shape, which is not limited herein. The relative position of pattern of the oscillator or the metal copper clad layer may be in a form that is exactly opposite to each other, or may be in a form that is staggered, which is not limited herein. It should be understood that the foregoing implementations are merely examples, and any simple variation based on this implementation falls within the protection scope of this embodiment of this application.

In a possible implementation, the metal pattern 213 has a vertical polarization characteristic, and the metal pattern 214 has a horizontal polarization characteristic. Therefore, the technical solution has a dual-polarization characteristic. The liquid crystal material 21311, the liquid crystal material 21321, the liquid crystal material 21411, and the liquid crystal material 21421 each have a phase modulation characteristic. Therefore, the technical solution has a polarization reconstructable characteristic.

Figure 22:
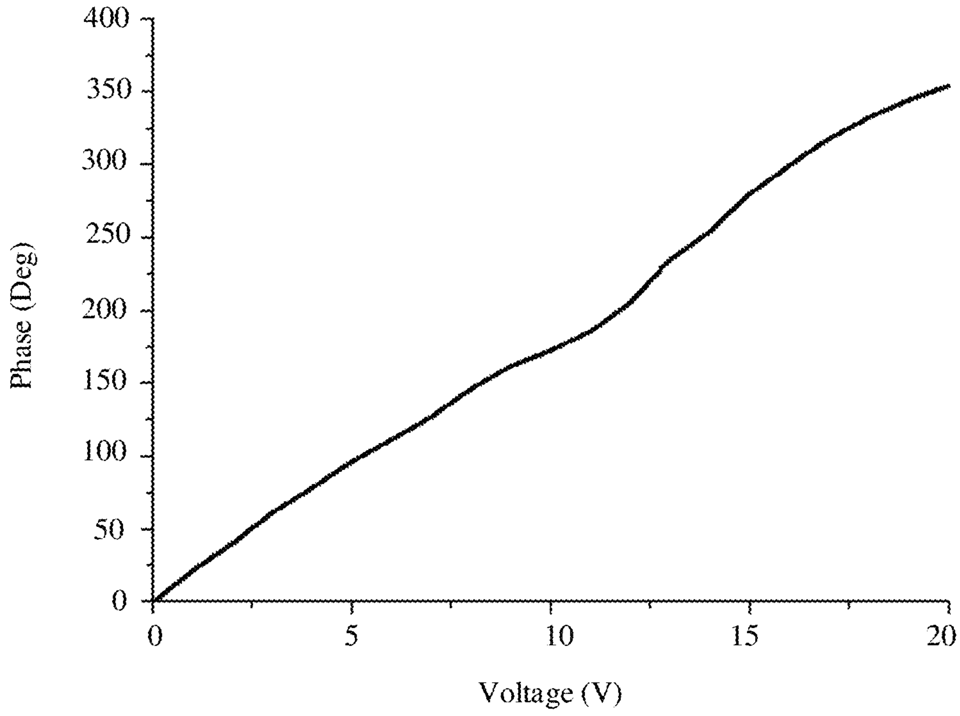
FIG. 22 is a schematic diagram of a relationship between a control voltage and a phase difference of a liquid crystal material according to an embodiment of this application.
Figure 23A:
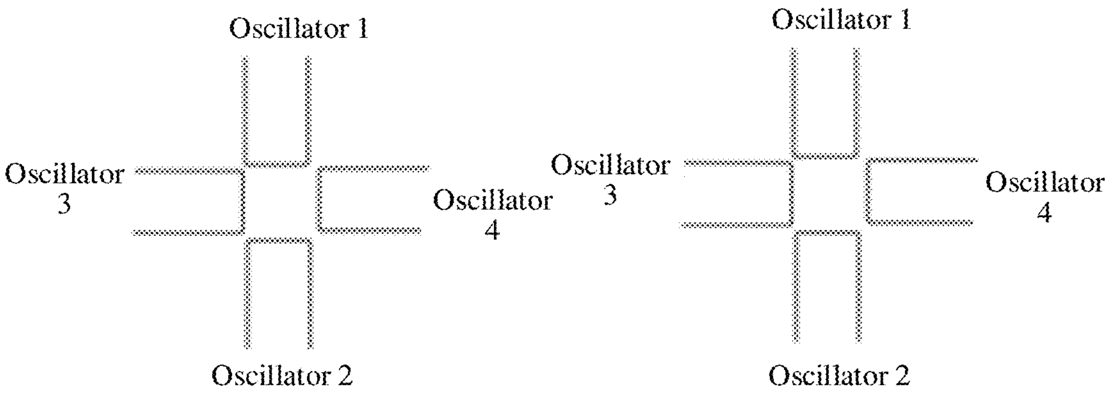
FIG. 23A to FIG. 23I are schematic diagrams of arrangement manners of polarization reconstructable liquid crystal metasurface antenna units according to an embodiment of this application.
Figure 23B:
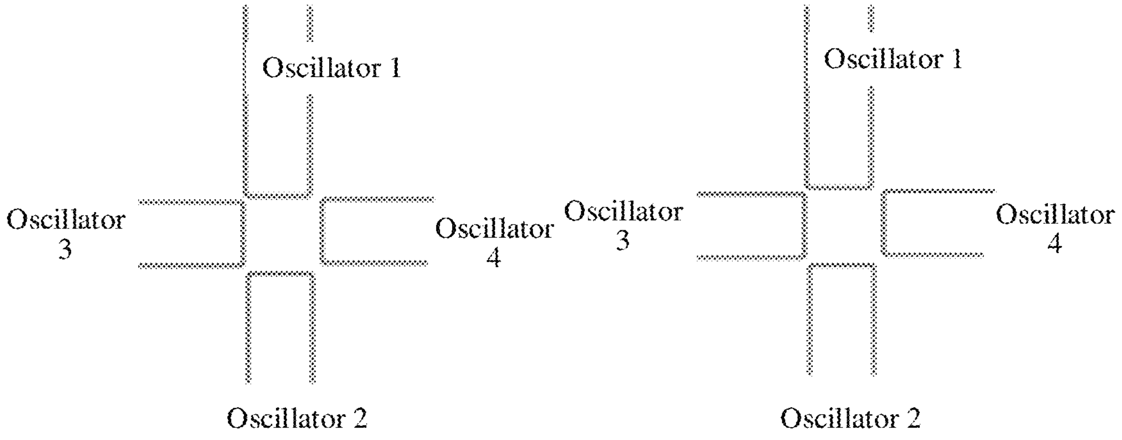
Figure 23C:
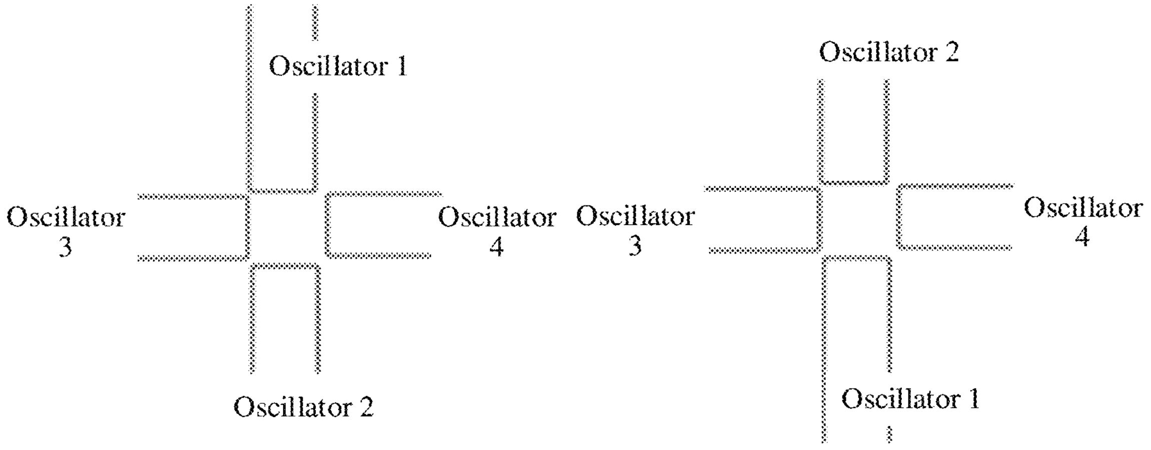
Figure 23D:
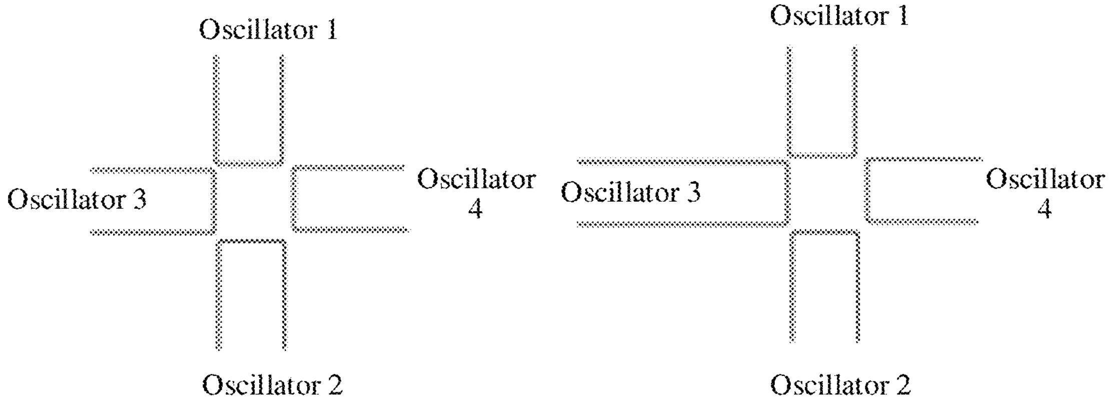
Figure 23E:
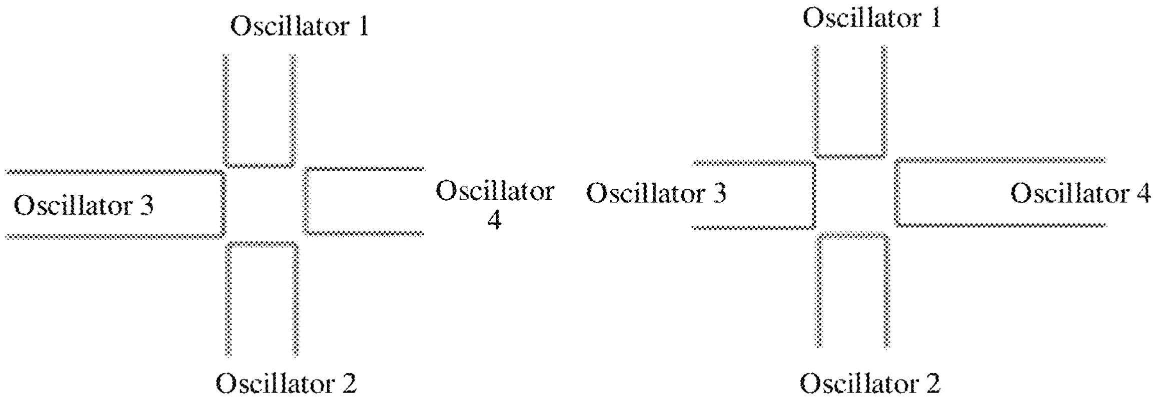
Figure 23F:
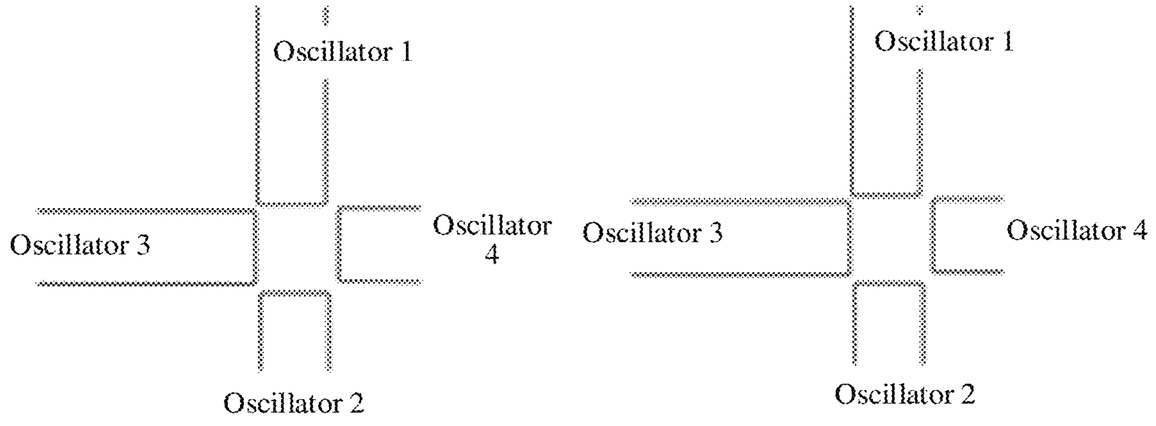
Figure 23G:
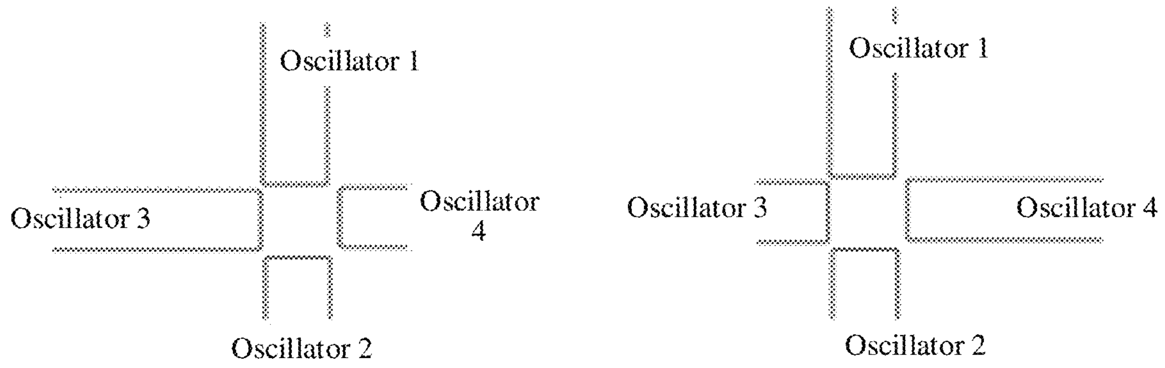
Figure 23H:
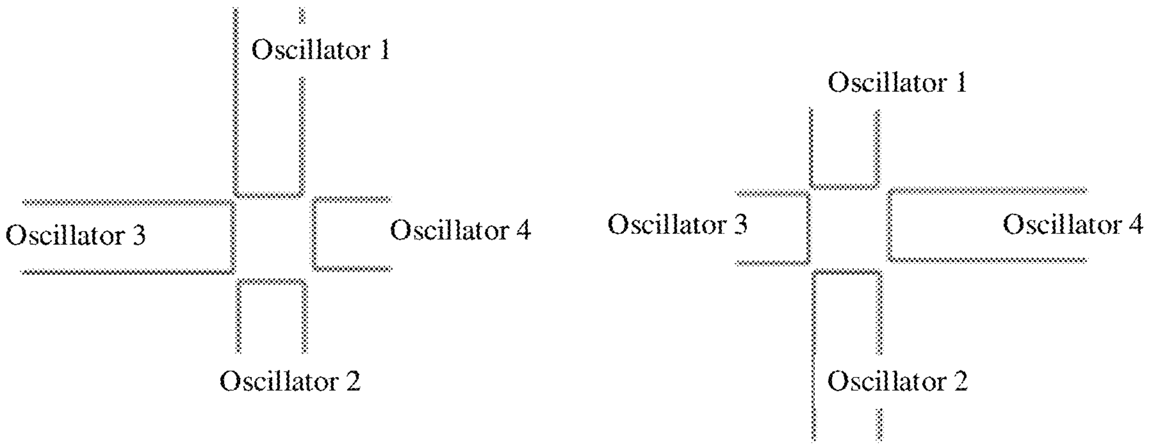
Figure 23I:
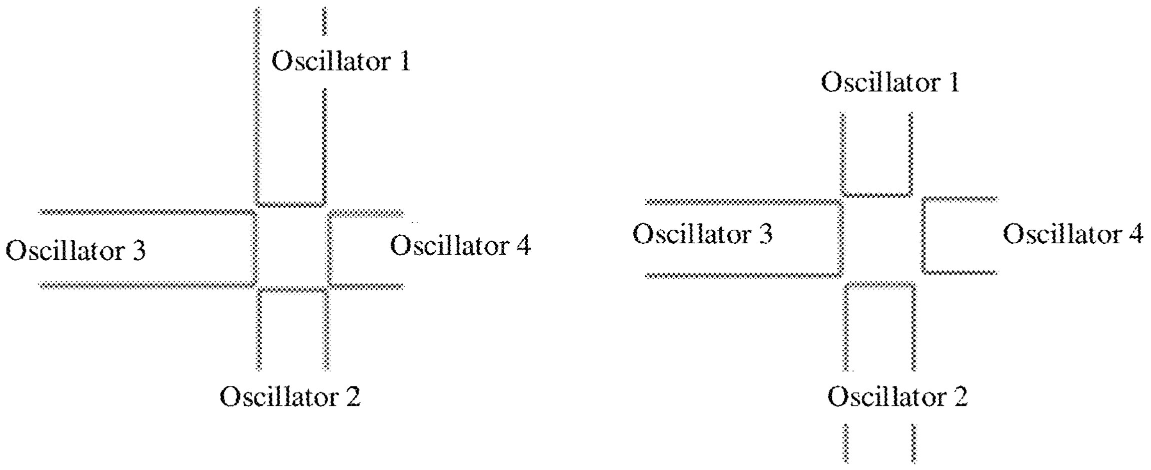

When a first horizontal oscillator and a first vertical oscillator are equal-length, that is, when the metal pattern 2131 and the metal pattern 2141 are completely equal-length, the phase difference of the liquid crystal material may be changed by changing the control voltage of the liquid crystal material, so that the polarization characteristic of the liquid crystal antenna unit is in different polarization characteristics. A relationship between the control voltage and the phase difference of the liquid crystal material is shown in FIG. 22:

(1) When the control voltages of the liquid crystal material 21311 and the liquid crystal material 21411 are changed, and a phase difference between the liquid crystal material 21311 and the liquid crystal material 21411 is 0° or 180°, a combined polarization characteristic is 45° linear polarization or −45° linear polarization. (The metal pattern 2132 and the metal pattern 2142, and the liquid crystal material 21321 and the liquid crystal material 21421 have a similar characteristic).

(2) When the control voltages of the liquid crystal material 21311 and the liquid crystal material 21411 are changed, and a phase difference between the liquid crystal material 21311 and the liquid crystal material 21411 is −90° or 90°, a combined polarization characteristic is left-handed circular polarization or right-handed circular polarization. (The metal pattern 2132 and the metal pattern 2142, and the liquid crystal material 21321 and the liquid crystal material 21421 have a similar characteristic).

(3) When the control voltages of the liquid crystal material 21311 and the liquid crystal material 21411 are changed, and a phase difference between the liquid crystal material 21311 and the liquid crystal material 21411 is not equal to 0°, +/−90°, and 180°, the polarization characteristic is left-handed elliptic polarization or right-handed elliptic polarization. (The metal pattern 2132 and the metal pattern 2142, and the liquid crystal material 21321 and the liquid crystal material 21421 have a similar characteristic).

It should be understood that the phase difference in the foregoing technical solution allows up and down fluctuation to a certain extent, and does not necessarily need to strictly comply with the foregoing angle. For example, the phase difference may be exactly equal to the foregoing angle, or may be slightly less than or greater than the foregoing angle.

This application further provides a polarization reconstructable liquid crystal metasurface antenna apparatus. As shown in FIG. 6, the apparatus includes a feed source 601 and a liquid crystal metasurface reflection plate 602. The polarization reconstructable liquid crystal metasurface reflecting plate is formed by arranging the polarization reconstructable liquid crystal metasurface antenna unit periodically. It should be understood that, for technical effects brought by the polarization reconstructable liquid crystal metasurface antenna apparatus, refer to the beneficial effects of the polarization reconstructable liquid crystal metasurface antenna unit. Details are not described herein again.

In a possible implementation, arrangement manners of the polarization reconstructable liquid crystal metasurface antenna units include but are not limited to those shown in FIG. 23. An oscillator 1 and an oscillator 2 are a group of oscillators and have a horizontal polarization characteristic; and an oscillator 3 and an oscillator 4 are a group of oscillators and have a vertical polarization characteristic. The oscillators have different physical lengths, and correspond to different resonance frequencies. When two oscillators in each group have the same physical length, corresponding polarization has a single-resonance characteristic, and the antenna works in a narrowband mode. When two oscillators in each group have different physical lengths, corresponding polarization has a multi-resonance characteristic, and the antenna works in a multi-band mode or a wideband mode. The arrangement manners of the metasurface antenna units are shown in FIG. 23A to FIG. 23I. As shown in FIG. 23A, the oscillator 1 and the oscillator 2 are equal-length, the oscillator 3 and the oscillator 4 are also equal-length, and arrangements of two antenna units on left and right sides are completely the same. As shown in FIG. 23B, the oscillator 1 and the oscillator 2 are unequal-length, the oscillator 3 and the oscillator 4 are equal-length, and arrangements of two antenna units on left and right sides are completely the same. As shown in FIG. 23C, in the left antenna unit, the oscillator 1 and the oscillator 2 are unequal-length, and the oscillator 3 and the oscillator 4 are equal-length; and compared with the left antenna unit, positions of the oscillator 1 and the oscillator 2 in the right antenna unit are interchanged, and the rest is the same as that in the left antenna unit. As shown in FIG. 23D, in the left antenna unit, the oscillator 1 and the oscillator 2 are equal-length, and the oscillator 3 and the oscillator 4 are equal-length; and in the right antenna unit, the oscillator 1 and the oscillator 2 are equal-length, and the oscillator 3 and the oscillator 4 are unequal-length. As shown in FIG. 23E, in the left antenna unit, the oscillator 1 and the oscillator 2 are equal-length, and the oscillator 3 and the oscillator 4 are unequal-length; and in the right antenna unit, positions of the oscillator 3 and the oscillator 4 are interchanged, and the rest is the same as that in the left antenna unit. As shown in FIG. 23F, arrangements of the antenna units on left and right sides are the same, where the oscillator 1 and the oscillator 2 are not equal, and the oscillator 3 and the oscillator 4 are not equal. As shown in FIG. 23G, in the left and right antenna units, the oscillator 1 and the oscillator 2 are unequal-length, the oscillator 3 and the oscillator 4 are also unequal-length, but a difference lies in that positions of the oscillator 3 and the oscillator 4 are interchanged. As shown in FIG. 23H, in the left and right antenna units, the oscillator 1 and the oscillator 2 are unequal-length, the oscillator 3 and the oscillator 4 are also unequal-length, but a difference lies in that positions of the oscillator 1 and the oscillator 2 are interchanged, and positions of the oscillator 3 and the oscillator 4 are also interchanged. As shown in FIG. 23I, in the left and right antenna units, the oscillator 1 and the oscillator 2 are unequal-length, the oscillator 3 and the oscillator 4 are also unequal-length, but a difference lies in that positions of the oscillator 1 and the oscillator 2 are interchanged. It should be understood that the foregoing implementations are merely examples, and any simple variation based on this implementation falls within the protection scope of this embodiment of this application.

In the foregoing possible implementations, the antenna unit has a regular arrangement or an irregular arrangement characteristic, and array arrangement is more flexible, thereby improving diversity and flexibility of a design process.

Figure 24:
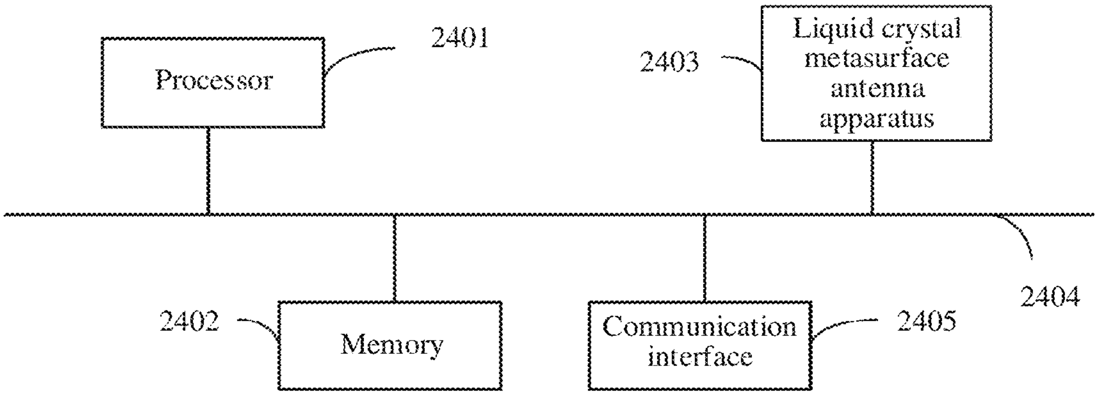
FIG. 24 is a schematic diagram of a structure of a communication apparatus according to an embodiment of this application.

This application further provides a communication apparatus, including the foregoing liquid crystal metasurface antenna apparatus. The communication apparatus may be any type of terminal, or may be any type of network device. This is not limited in this application. It should be understood that, for technical effects brought by the communication apparatus, refer to the beneficial effects of the corresponding liquid crystal metasurface antenna apparatus provided in the foregoing embodiments. Details are not described herein again. As shown in FIG. 24, the communication apparatus provided in this embodiment of this application includes a processor 2401, a memory 2402, a liquid crystal metasurface antenna apparatus 2403, and a communication interface 2405. The processor 2401, the memory 2402, the liquid crystal metasurface antenna apparatus 2403, and the communication interface 2405 are connected through a system bus 2404. A computer program of the communication apparatus is stored in the memory 2402, and the processor 2401 executes corresponding computer code to perform a corresponding function, to control the liquid crystal metasurface antenna apparatus 2403 to send and receive a signal.

In a specific implementation of this application, the memory 2402 may include a volatile memory, for example, a non-volatile dynamic random access memory (NVRAM), a phase-change random access memory (phase-change RAM, PRAM), or a magnetoresistive random access memory (MRAM); or the memory 2402 may include a non-volatile memory, for example, at least one magnetic disk storage device, an electrically erasable programmable read-only memory (EEPROM), or a flash memory device such as a NOR flash memory or a NAND flash memory. The non-volatile memory stores an operating system and an application program that are executed by the processor. The processor 2401 loads a running program and data from the non-volatile memory into a memory and stores data content in a large-capacity storage apparatus.

The processor 2401 is a control center of the communication apparatus. The processor 2401 is connected to various parts of the entire communication apparatus by using various interfaces and lines, and executes various functions and data processing of the communication apparatus by running or executing software programs and/or application modules stored in the memory 2402 and by invoking data stored in the memory 2402, so as to provide overall monitoring for the communication apparatus.

The processor 2401 may include only a CPU, or may include a combination of a CPU, a graphic processing unit (GPU), a DSP, and a control chip (such as a baseband chip) of a communication unit. In this implementation of this application, the CPU may include a single computing core, or may include a plurality of computing cores. In some embodiments, the processor 2401 and the memory 2402 may exist in a form of one device, such as a single-chip microcomputer.

The system bus 2404 may be an industry standard architecture (ISA) bus, a peripheral component interconnect (PCI) bus, or an extended industry standard architecture (EISA) bus. The system bus 2404 may be classified into an address bus, a data bus, a control bus, and the like.

The liquid crystal metasurface antenna apparatus 2403 communicates with the processor 2401 by using the system bus 2404, and implements a communication function of the communication apparatus under control of the processor 2401.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in another manner. For example, the described apparatus embodiment is merely an example. For example, the unit division is merely logical function division and may be other division during an actual implementation. For example, a plurality of units or components may be combined or integrated into another system, or some features may be ignored or not performed. In addition, the displayed or discussed mutual indirect couplings or direct couplings or communication connections may be implemented by using some interfaces. The indirect couplings or communication connections between the apparatuses or units may be implemented in electronic or other forms.

Units described as separate parts may or may not be physically separated, and parts displayed as units may or may not be physical units, namely, may be located in one position, or may be distributed on a plurality of network units. Some or all of the units may be selected according to actual needs to achieve the objectives of the solutions of embodiments.

When the integrated unit is implemented in the form of a software function unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application.

The foregoing descriptions are merely some specific implementations of this application, but are not intended to limit the protection scope of this application. Any person skilled in the art may make changes and modifications to these embodiments within the technical scope disclosed in this application. Therefore, the following claims are intended to be construed as to cover the foregoing embodiments and changes and modifications falling within the scope of this application. Therefore, the protection scope of this application shall be subjected to the protection scope of the claims.

What is claimed is:

1. A liquid crystal metasurface antenna apparatus, comprising:

a feed source; and a liquid crystal metasurface reflection plate comprising a plurality of liquid crystal antenna units, wherein each liquid crystal antenna unit at least comprises: a plurality of oscillators and two layers of dielectric plates, and in each liquid crystal antenna unit the plurality of oscillators are disposed between the two layers of dielectric plates, and each plurality of oscillators comprise a horizontal oscillator pair or a vertical oscillator pair; and wherein each oscillator of each plurality of oscillators comprises a left arm, a right arm, and a capacitor, and in each oscillator the left arm and the right arm are connected through the capacitor, and a liquid crystal material is filled in a space enclosed by the left arm, the right arm, and the capacitor.

2. The liquid crystal metasurface antenna apparatus according to claim 1, wherein:

each horizontal oscillator pair comprises a first horizontal oscillator in a horizontal direction and a second horizontal oscillator in the horizontal direction; and each vertical oscillator pair comprises a first vertical oscillator in a vertical direction and a second vertical oscillator in the vertical direction.

3. The liquid crystal metasurface antenna apparatus according to claim 1, wherein:

each horizontal oscillator pair has a vertical polarization characteristic; and each vertical oscillator pair has a horizontal polarization characteristic.

4. The liquid crystal metasurface antenna apparatus according to claim 2, wherein:

in each horizontal oscillator pair the first horizontal oscillator and the second horizontal oscillator are equal-length or unequal-length; and in each vertical oscillator pair the first vertical oscillator and the second vertical oscillator are equal-length or unequal-length.

5. The liquid crystal metasurface antenna apparatus according to claim 2, wherein:

in each horizontal oscillator, when the first horizontal oscillator and the second horizontal oscillator are unequal-length, the liquid crystal antenna unit is in a dual-band mode or a wideband mode; and in each vertical oscillator, when the first vertical oscillator and the second vertical oscillator are unequal-length, the liquid crystal antenna unit is in the dual-band mode or the wideband mode.

6. The liquid crystal metasurface antenna apparatus according to claim 1, wherein:

in each horizontal oscillator pair comprising a first horizontal oscillator in a horizontal direction and a second horizontal oscillator in the horizontal direction, when the first horizontal oscillator and the second horizontal oscillator are equal-length, the liquid crystal antenna unit is in a single-band mode; and in each vertical oscillator pair comprising a first vertical oscillator in a vertical direction and a second vertical oscillator in the vertical direction, when the first vertical oscillator and the second vertical oscillator are equal-length, the liquid crystal antenna unit is in the single-band mode.

7. The liquid crystal metasurface antenna apparatus according to claim 1, wherein:

for each liquid crystal antenna unit comprising at least one horizontal oscillator pair comprising a first horizontal oscillator in a horizontal direction and a second horizontal oscillator in the horizontal direction, and comprising at least one vertical oscillator pair comprising a first vertical oscillator in a vertical direction and a second vertical oscillator in the vertical direction, when the first horizontal oscillator and the first vertical oscillator are equal-length:

when a phase difference of the liquid crystal material is 0° or 180°, a polarization characteristic of the corresponding liquid crystal antenna unit is 45° polarization or −45° polarization;

when the phase difference of the liquid crystal material is −90° or 90°, the polarization characteristic of the corresponding liquid crystal antenna unit is left-handed circular polarization or right-handed circular polarization; and when the phase difference of the liquid crystal material is not equal to 0°, 90°, −90°, or 180°, the polarization characteristic of the corresponding liquid crystal antenna unit is left-handed elliptic polarization or right-handed elliptic polarization.

8. The liquid crystal metasurface antenna apparatus according to claim 1, wherein a loading mode of the liquid crystal material is locally loaded.

9. The liquid crystal metasurface antenna apparatus according to claim 1, wherein filling manners of liquid crystal materials of the plurality of oscillators are the same or different.

10. The liquid crystal metasurface antenna apparatus according to claim 9, wherein the filling manner comprises full filling, partial filling, and overflow filling.

11. The liquid crystal metasurface antenna apparatus according to claim 1, wherein the feed source is located at a focal point of the liquid crystal metasurface reflection plate.

12. The liquid crystal metasurface antenna apparatus according to claim 1, wherein each plurality of oscillators in all the liquid crystal antenna units are arranged in a same manner.

13. A communication apparatus, comprising:

a liquid crystal metasurface antenna apparatus, comprising: a liquid crystal metasurface reflection plate and a feed source;

wherein the liquid crystal metasurface reflection plate comprises a plurality of liquid crystal antenna units, each liquid crystal antenna unit at least comprises: a plurality of oscillators and two layers of dielectric plates, and in each liquid crystal antenna unit the plurality of oscillators are disposed between the two layers of dielectric plates, and each plurality of oscillators comprises a horizontal oscillator pair or a vertical oscillator pair; and wherein each oscillator of the plurality of oscillators comprises a left arm, a right arm, and a capacitor, and in each oscillator the left arm and the right arm are connected through the capacitor, and a liquid crystal material is filled in a space enclosed by the left arm, the right arm, and the capacitor.

14. The communication apparatus according to claim 13, wherein:

each horizontal oscillator pair comprises a first horizontal oscillator in a horizontal direction and a second horizontal oscillator in a horizontal direction; and the vertical oscillator pair comprises a first vertical oscillator in a vertical direction and a second vertical oscillator in a vertical direction.

15. The communication apparatus according to claim 13, wherein:

each horizontal oscillator pair has a vertical polarization characteristic; and each vertical oscillator pair has a horizontal polarization characteristic.

16. The communication apparatus according to claim 14, wherein:

in each horizontal oscillator the first horizontal oscillator and the second horizontal oscillator are equal-length or unequal-length; and in each vertical oscillator the first vertical oscillator and the second vertical oscillator are equal-length or unequal-length.

17. The communication apparatus according to claim 14, wherein:

in each horizontal oscillator when the first horizontal oscillator and the second horizontal oscillator are unequal-length, the liquid crystal antenna unit is in a dual-band mode or a wideband mode; and in each vertical oscillator when the first vertical oscillator and the second vertical oscillator are unequal-length, the liquid crystal antenna unit is in the dual-band mode or the wideband mode.

18. The communication apparatus according to claim 13, wherein:

in each horizontal oscillator pair comprising a first horizontal oscillator in a horizontal direction and a second horizontal oscillator in the horizontal direction, when the first horizontal oscillator and the second horizontal oscillator are equal-length, the corresponding liquid crystal antenna unit is in a single-band mode; and in each vertical oscillator pair comprising a first vertical oscillator in a vertical direction and a second vertical oscillator in the vertical direction, when the first vertical oscillator and the second vertical oscillator are equal-length, the corresponding liquid crystal antenna unit is in the single-band mode.

19. The communication apparatus according to claim 13, wherein:

in each liquid crystal antenna unit comprising at least one horizontal oscillator pair comprising a first horizontal oscillator in a horizontal direction and a second horizontal oscillator in the horizontal direction, and comprising at least one vertical oscillator pair comprising a first vertical oscillator in a vertical direction and a second vertical oscillator in the vertical direction, when the first horizontal oscillator and the first vertical oscillator are equal-length:

when a phase difference of the liquid crystal material is 0° or 180°, a polarization characteristic of the liquid crystal antenna unit is 45° polarization or −45° polarization;

when the phase difference of the liquid crystal material is −90° or 90°, the polarization characteristic of the liquid crystal antenna unit is left-handed circular polarization or right-handed circular polarization; and when the phase difference of the liquid crystal material is not equal to 0°, 90°, −90°, or 180°, the polarization characteristic of the liquid crystal antenna unit is left-handed elliptic polarization or right-handed elliptic polarization.

20. The communication apparatus according to claim 13, wherein: a loading mode of the liquid crystal material is locally loaded.

* * * * *